May 27, 1952     W. A. GRUENEBERG     2,598,254
MACHINE FOR THE MANUFACTURE OF MOLDED BUILDING UNITS
Filed Aug. 2, 1946     20 Sheets-Sheet 1
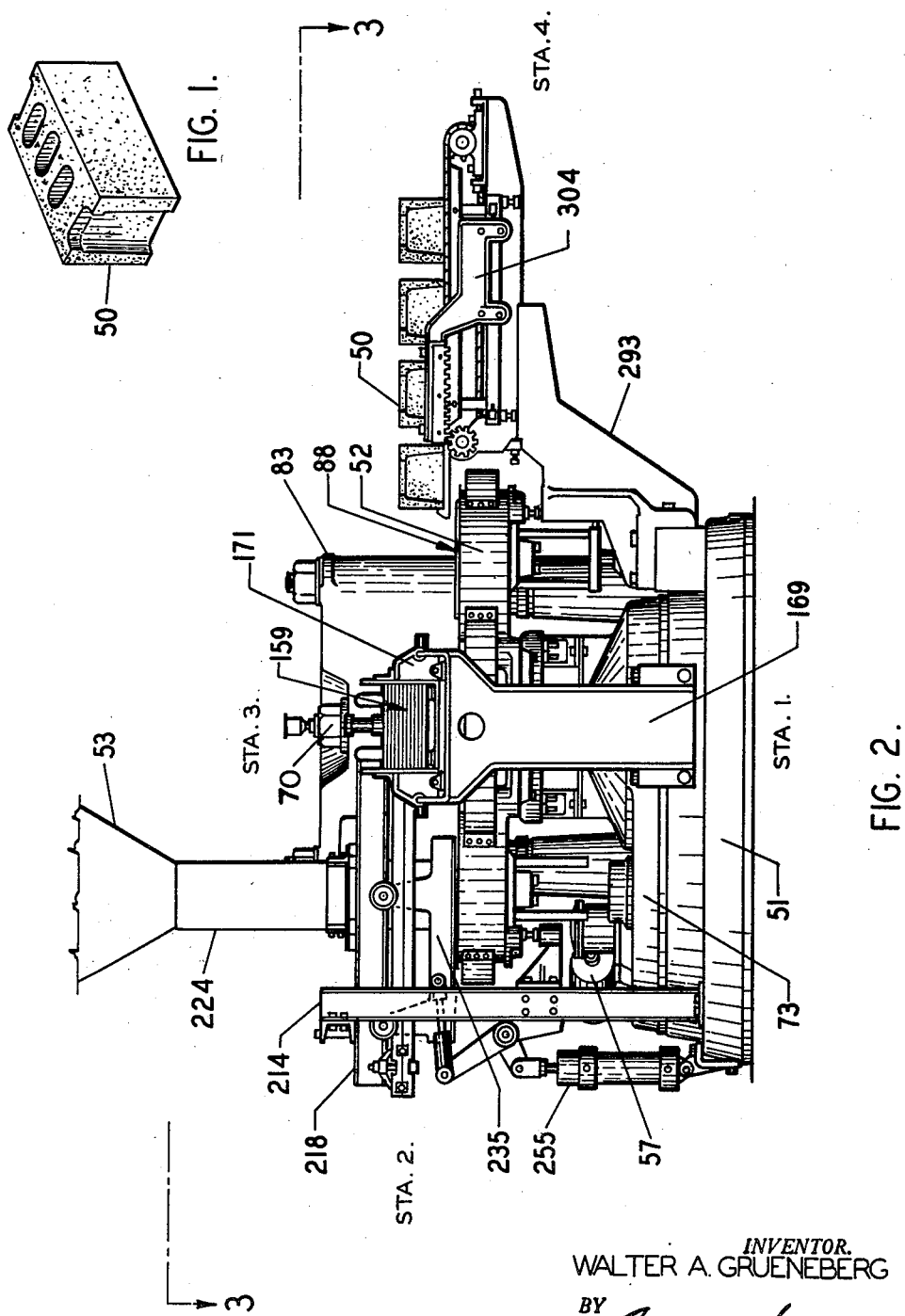
INVENTOR.
WALTER A. GRUENEBERG
BY
ATTORNEY May 27, 1952     W. A. GRUENEBERG     2,598,254
MACHINE FOR THE MANUFACTURE OF MOLDED BUILDING UNITS
Filed Aug. 2, 1946     20 Sheets-Sheet 3

INVENTOR.
WALTER A. GRUENEBERG
BY
ATTORNEY

May 27, 1952  W. A. GRUENEBERG  2,598,254
MACHINE FOR THE MANUFACTURE OF MOLDED BUILDING UNITS
Filed Aug. 2, 1946  20 Sheets-Sheet 4
FIG. 6.
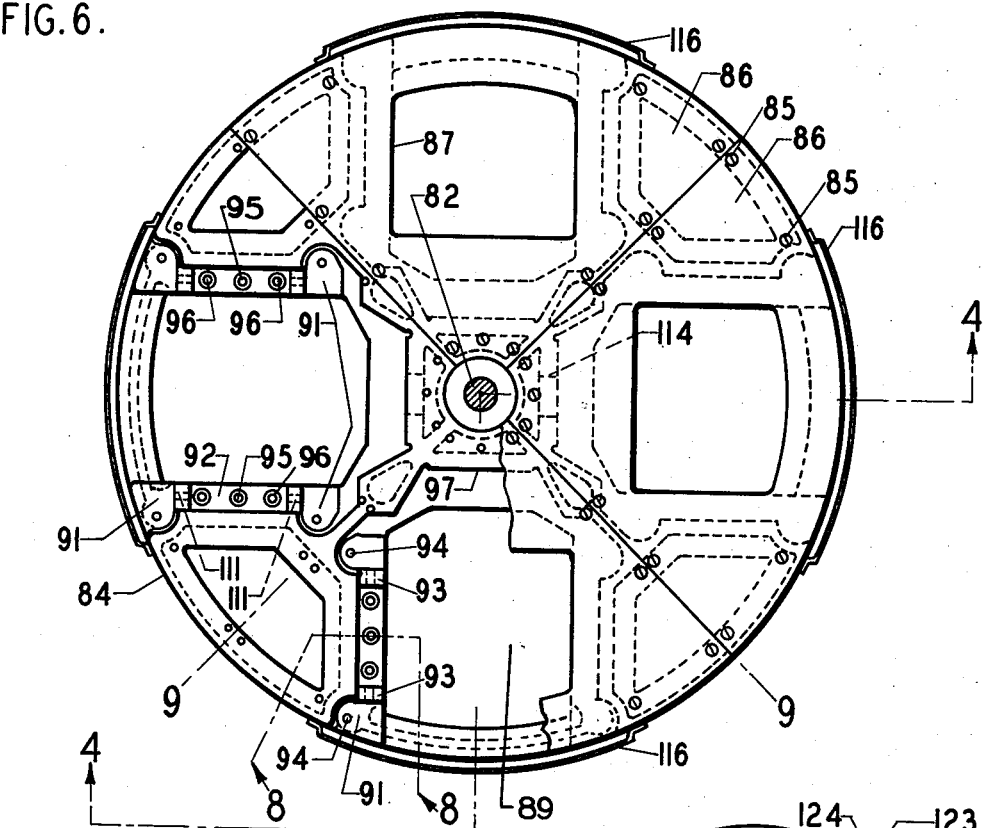
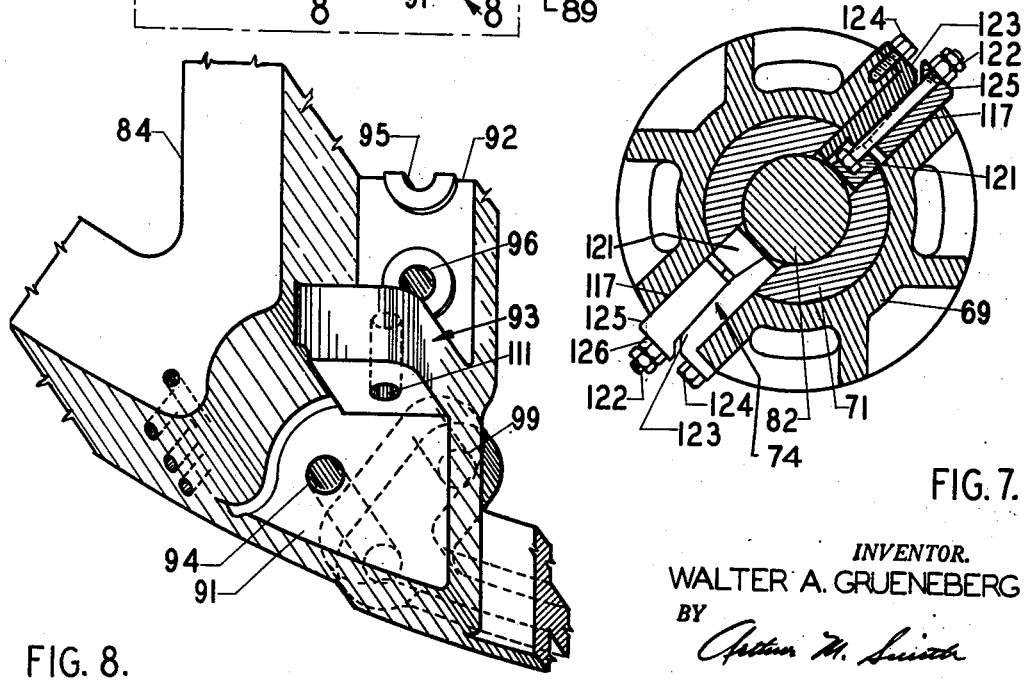
FIG. 7.
FIG. 8.
INVENTOR.
WALTER A. GRUENEBERG
BY
ATTORNEY May 27, 1952  W. A. GRUENEBERG  2,598,254
MACHINE FOR THE MANUFACTURE OF MOLDED BUILDING UNITS
Filed Aug. 2, 1946  20 Sheets-Sheet 5

INVENTOR.
WALTER A. GRUENEBERG
BY Arthur M. Smith
ATTORNEY

FIG. II.

May 27, 1952 W. A. GRUENEBERG 2,598,254
MACHINE FOR THE MANUFACTURE OF MOLDED BUILDING UNITS
Filed Aug. 2, 1946 20 Sheets-Sheet 7
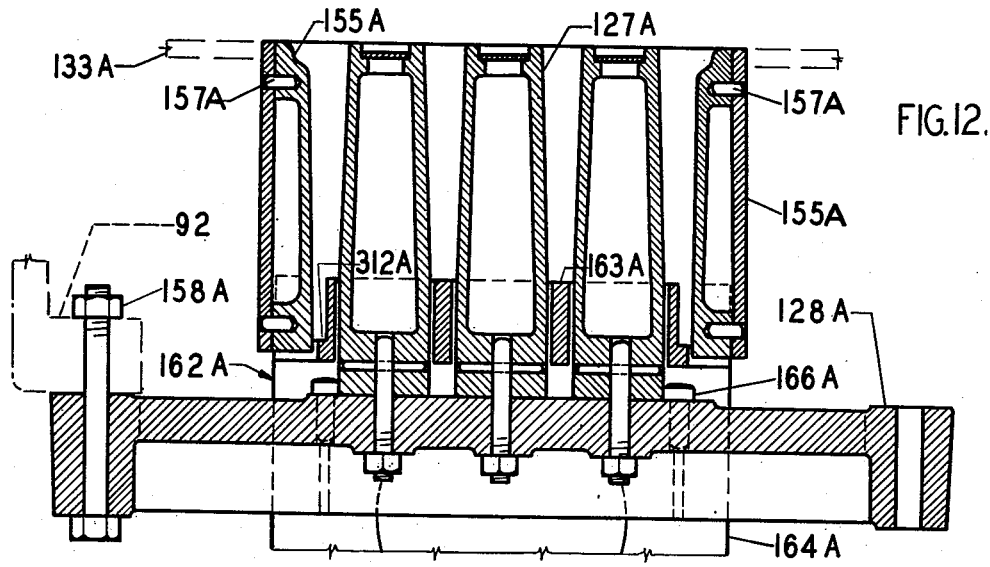
FIG. 12.
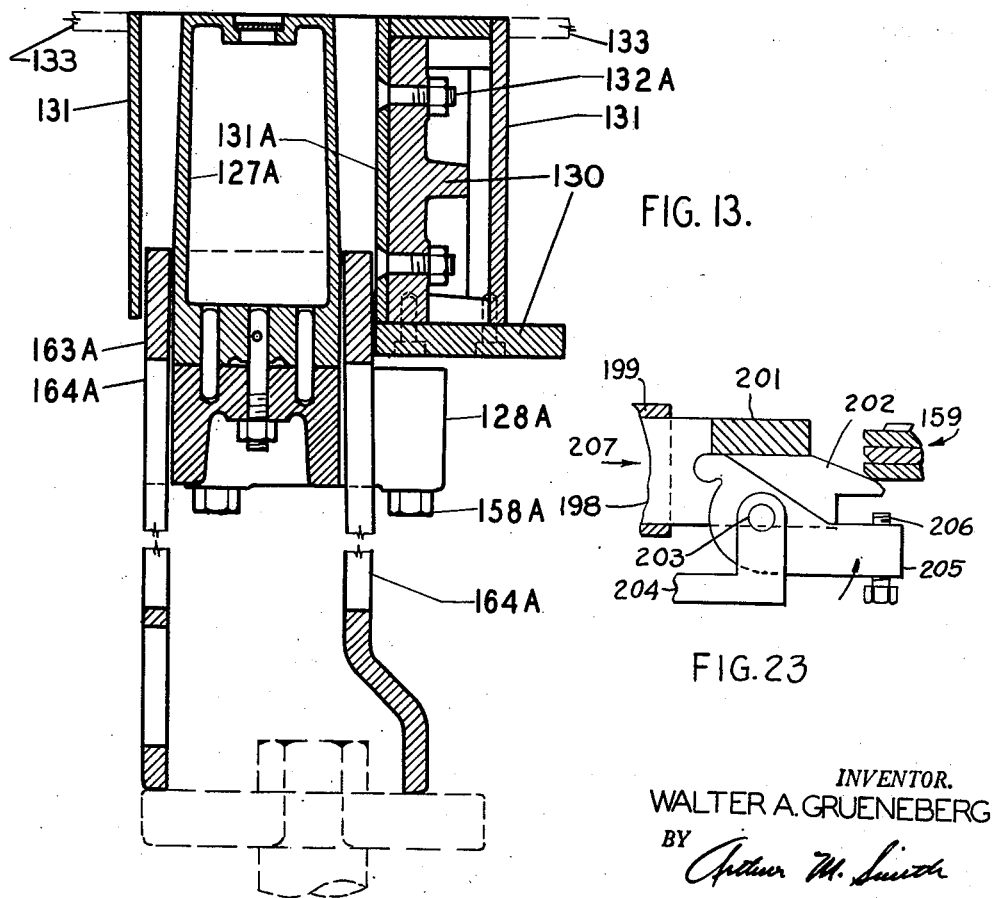
FIG. 13.
FIG. 23
INVENTOR.
WALTER A. GRUENEBERG
BY
ATTORNEY

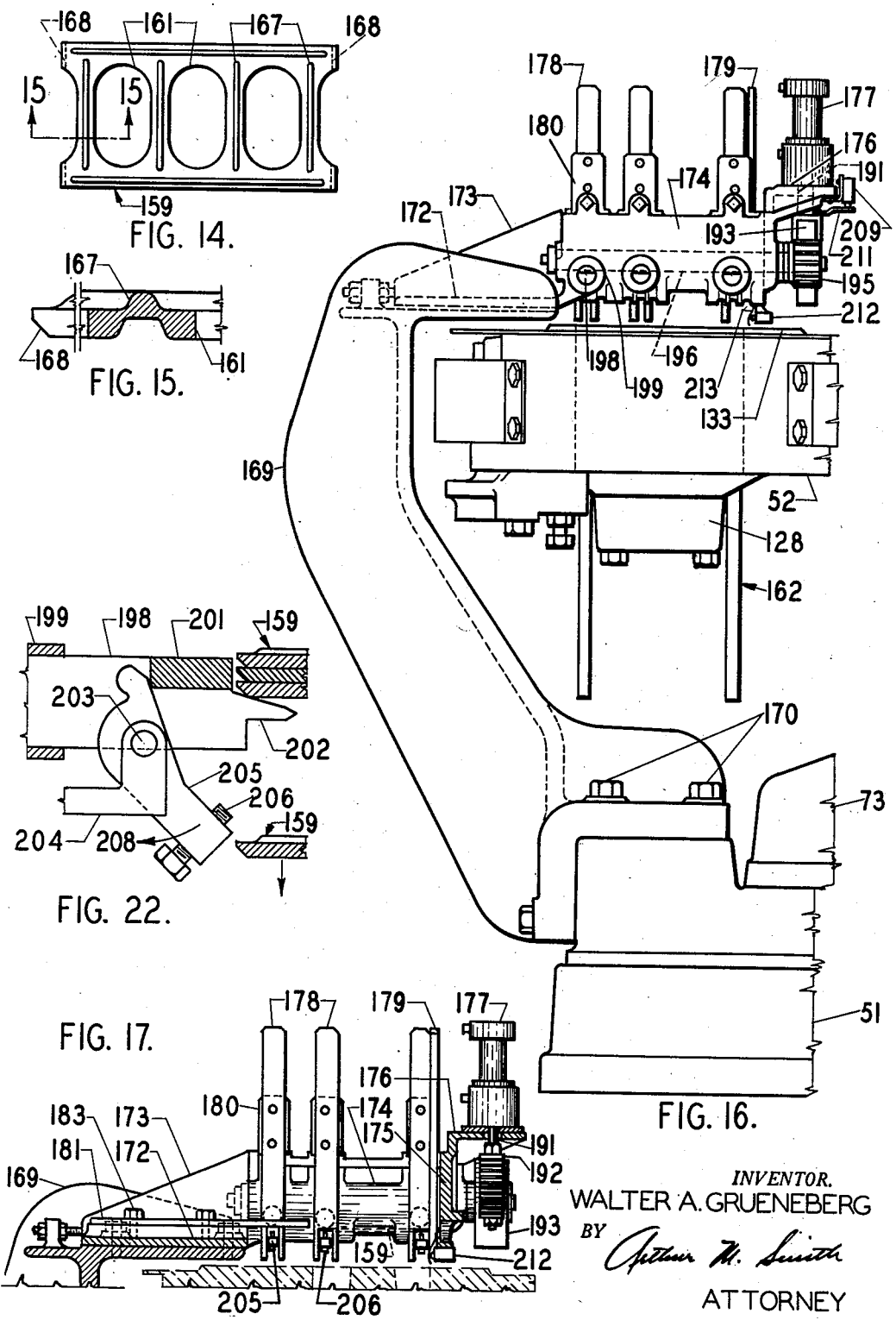

May 27, 1952     W. A. GRUENEBERG     2,598,254
MACHINE FOR THE MANUFACTURE OF MOLDED BUILDING UNITS
Filed Aug. 2, 1946                                20 Sheets-Sheet 9
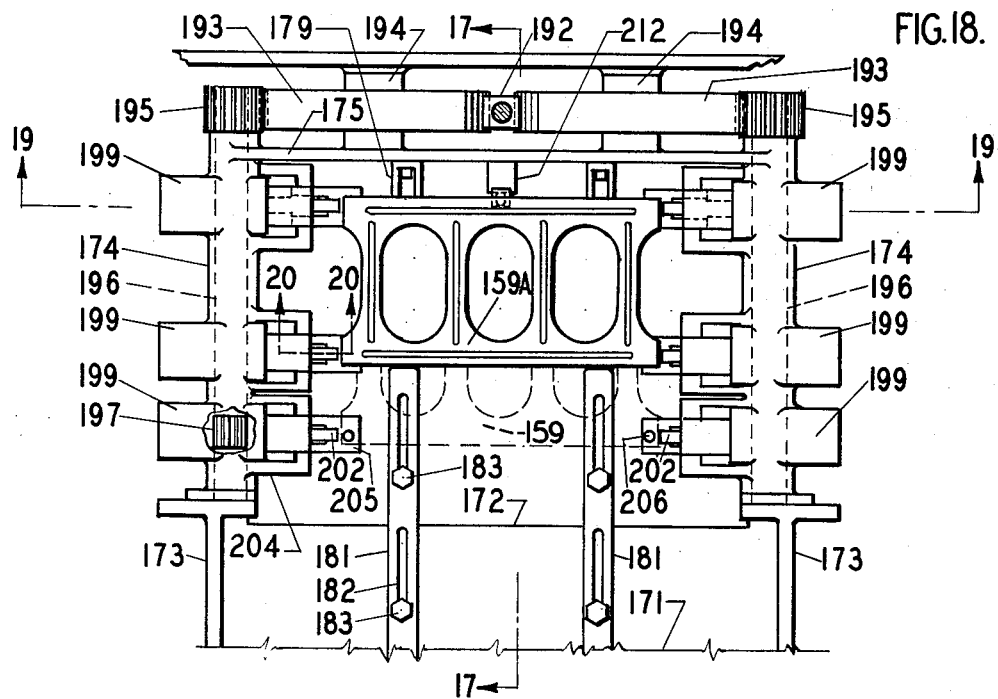
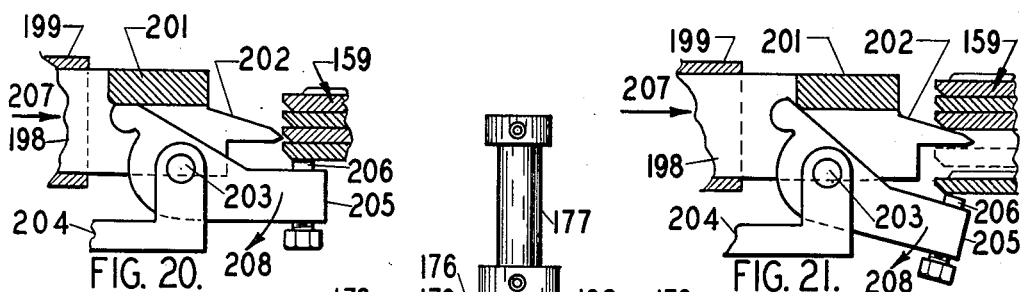
INVENTOR.
WALTER A. GRUENEBERG
BY
ATTORNEY May 27, 1952 W. A. GRUENEBERG 2,598,254
MACHINE FOR THE MANUFACTURE OF MOLDED BUILDING UNITS
Filed Aug. 2, 1946 20 Sheets-Sheet 10
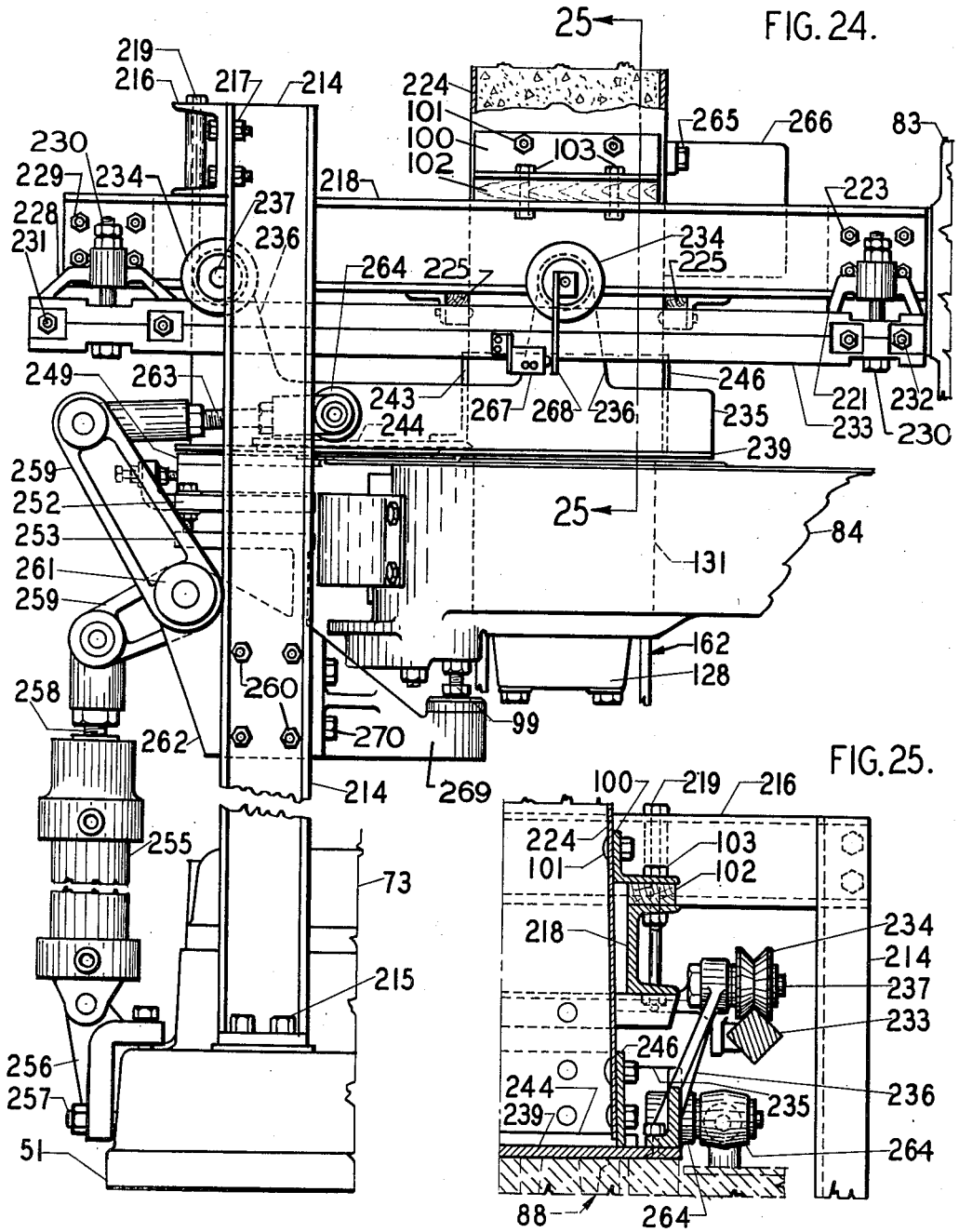
INVENTOR.
WALTER A. GRUENEBERG
BY
Arthur M. Smith
ATTORNEY May 27, 1952     W. A. GRUENEBERG     2,598,254
MACHINE FOR THE MANUFACTURE OF MOLDED BUILDING UNITS
Filed Aug. 2, 1946     20 Sheets-Sheet 11

INVENTOR.
WALTER A. GRUENEBERG
BY
ATTORNEY

May 27, 1952  W. A. GRUENEBERG  2,598,254
MACHINE FOR THE MANUFACTURE OF MOLDED BUILDING UNITS
Filed Aug. 2, 1946  20 Sheets-Sheet 12

*INVENTOR.*
WALTER A. GRUENBERG
BY
Arthur M. Smith
ATTORNEY

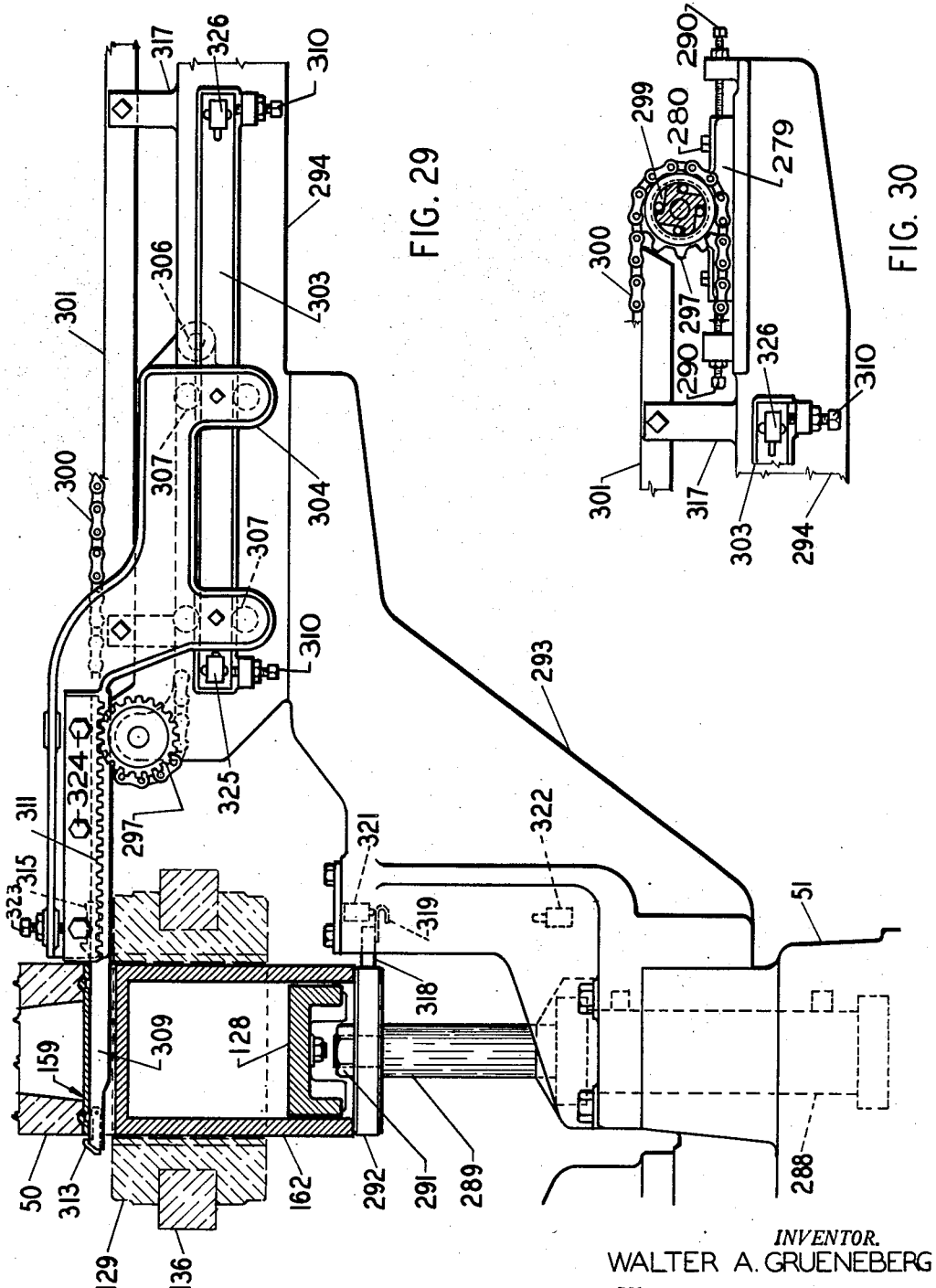

May 27, 1952 W. A. GRUENEBERG 2,598,254
MACHINE FOR THE MANUFACTURE OF MOLDED BUILDING UNITS
Filed Aug. 2, 1946 20 Sheets-Sheet 14
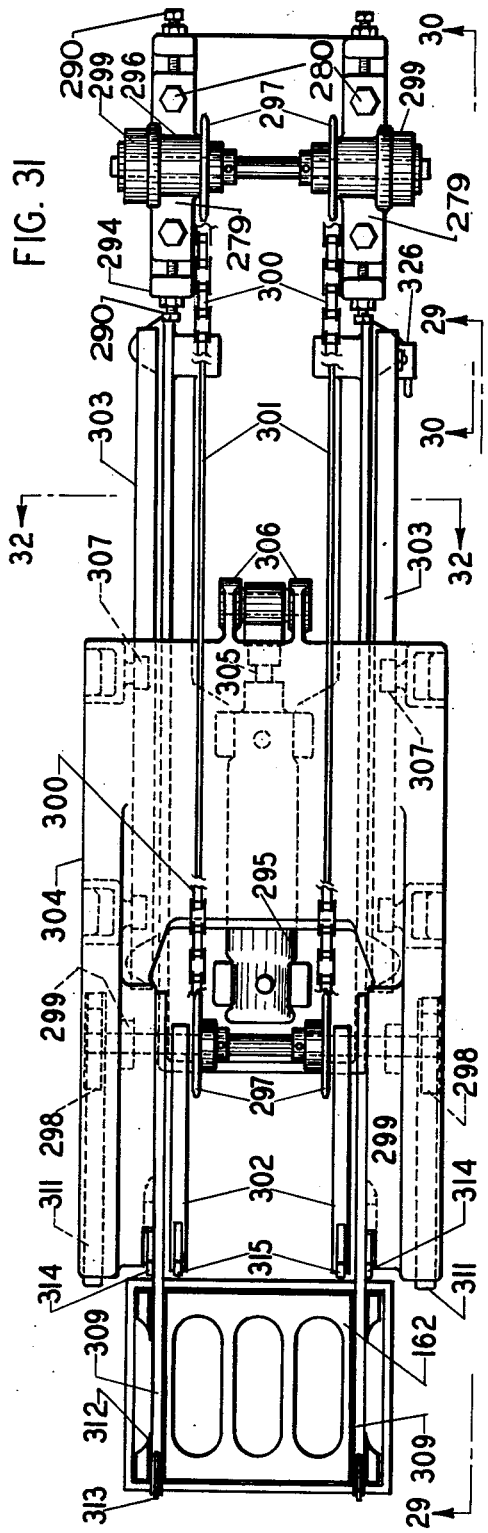
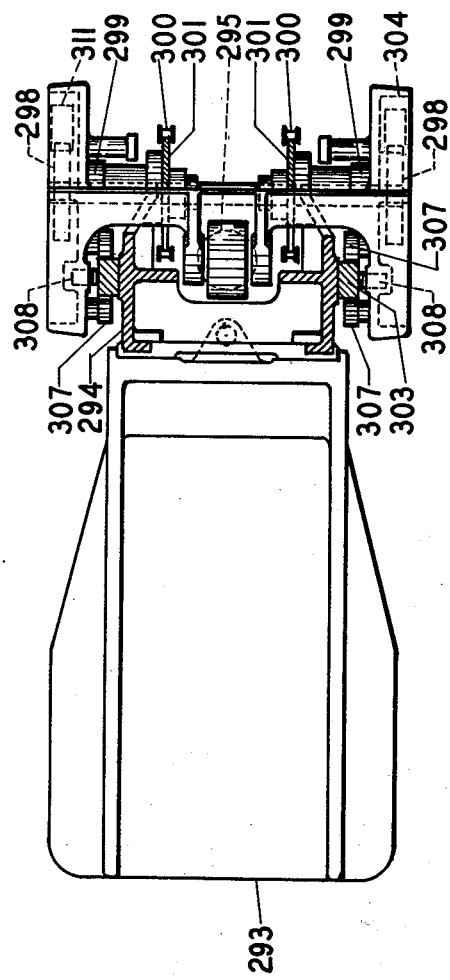
*INVENTOR.*
WALTER A. GRUENEBERG
BY
ATTORNEY May 27, 1952  W. A. GRUENEBERG  2,598,254
MACHINE FOR THE MANUFACTURE OF MOLDED BUILDING UNITS
Filed Aug. 2, 1946  20 Sheets-Sheet 16

INVENTOR.
WALTER A. GRUENEBERG
BY
*Arthur M. Smith*
ATTORNEY

May 27, 1952  W. A. GRUENEBERG  2,598,254
MACHINE FOR THE MANUFACTURE OF MOLDED BUILDING UNITS
Filed Aug. 2, 1946  20 Sheets-Sheet 17

INVENTOR.
WALTER A. GRUENEBERG
BY
Arthur M. Smith
ATTORNEY

Patented May 27, 1952

2,598,254

UNITED STATES PATENT OFFICE 2,598,254

MACHINE FOR THE MANUFACTURE OF MOLDED BUILDING UNITS

Walter A. Grueneberg, Saginaw, Mich., assignor to Jackson & Church Company, Saginaw, Mich., a corporation of Michigan Application August 2, 1946, Serial No. 688,118

8 Claims. (Cl. 18—41)

The present invention relates to a machine for the manufacture of molded building units, and in particular to such units in the form of building blocks, bricks, or panels utilizing a binder of cement, lime and the like, or similar materials, with any desired type of aggregate.

A primary object of the present invention is to provide a machine particularly adapted to the mass production of molded building units to obtain improved and uniform physical properties therein.

Another object of the present invention is to provide an automatic molding machine which will economically and rapidly manufacture building units of the character described by mass production methods, the machine being particularly characterized by a plurality of mold boxes mounted in a rotatable table, a plurality of work stations disposed about said table to perform progressively the necessary operations in the manufacture of a plurality of molded building units as each of said mold boxes are successively indexed from one work station to another by the intermittent rotation of said table.

Other objects of the present invention are to provide in a molding machine of the character described a new and improved automatic mechanism for supplying pallets as required to the bottom of the mold boxes, for supplying and controlling the supply of a plastic mix to the mold box, for compressing the mix within the mold box so that the pressure may be regulated and maintained uniform for each unit, for stripping the compressed unit from the mold box and for removing such unit from the machine.

Other objects of the present invention are to provide an electromagnetic vibratory system for the mix chute and mold boxes so as to facilitate control of the amplitude and frequency of the vibration and the timing of the vibration periods, to provide means to shield the vibrations of the mix chute from the body of the machine, and to provide a new and improved spring suspension for the mold boxes so as to prevent vertical vibration thereof and to reduce the transfer of vibration to the body of the machine.

Other objects of the present invention are to provide in a molding machine of the character described a readily controlled source of power for the various functions of the machine, to provide an automatic timing mechanism whereby the aforesaid table is caused to index to new positions and the various work operations in the manufacture of a building unit by said machine are automatically caused to operate, and to provide a system of safety controls whereby the table is prevented from indexing if the work operations are not satisfactorily completed to allow indexing of the table without injury to said machine.

Still a further object of the present invention is to provide a molding machine of the character described and which can be completely disassembled for cleaning, repairing, or shipping, and which is especially adapted for adjustment of interacting parts with respect to each other to permit its ready adjustment for molding materials of various physical properties.

Other objects of this invention will appear in the following description and appended claims, reference being had to the accompanying drawings forming a part of this specification wherein like reference characters designate corresponding parts in the several views.

Fig. 1 is an isometric view of one type of concrete block which the machine embodying the present invention is adapted to make.

Fig. 2 is a side elevation of a block-making machine embodying the present invention, taken in the direction of the arrows 2—2 of Fig. 3.

Fig. 6 is a top view of the table, taken in the direction of the arrows 6—6 of Fig. 4, portions of the table cover plates being removed.

Fig. 7 is an enlarged horizontal section through the key assembly which locks the table of the present invention to the table drive mechanism.

Fig. 8 is an isometric enlargement of the table section within the line 8—8 of Fig. 6, taken essentially in the direction of the arrows thereof.

Figure 3:
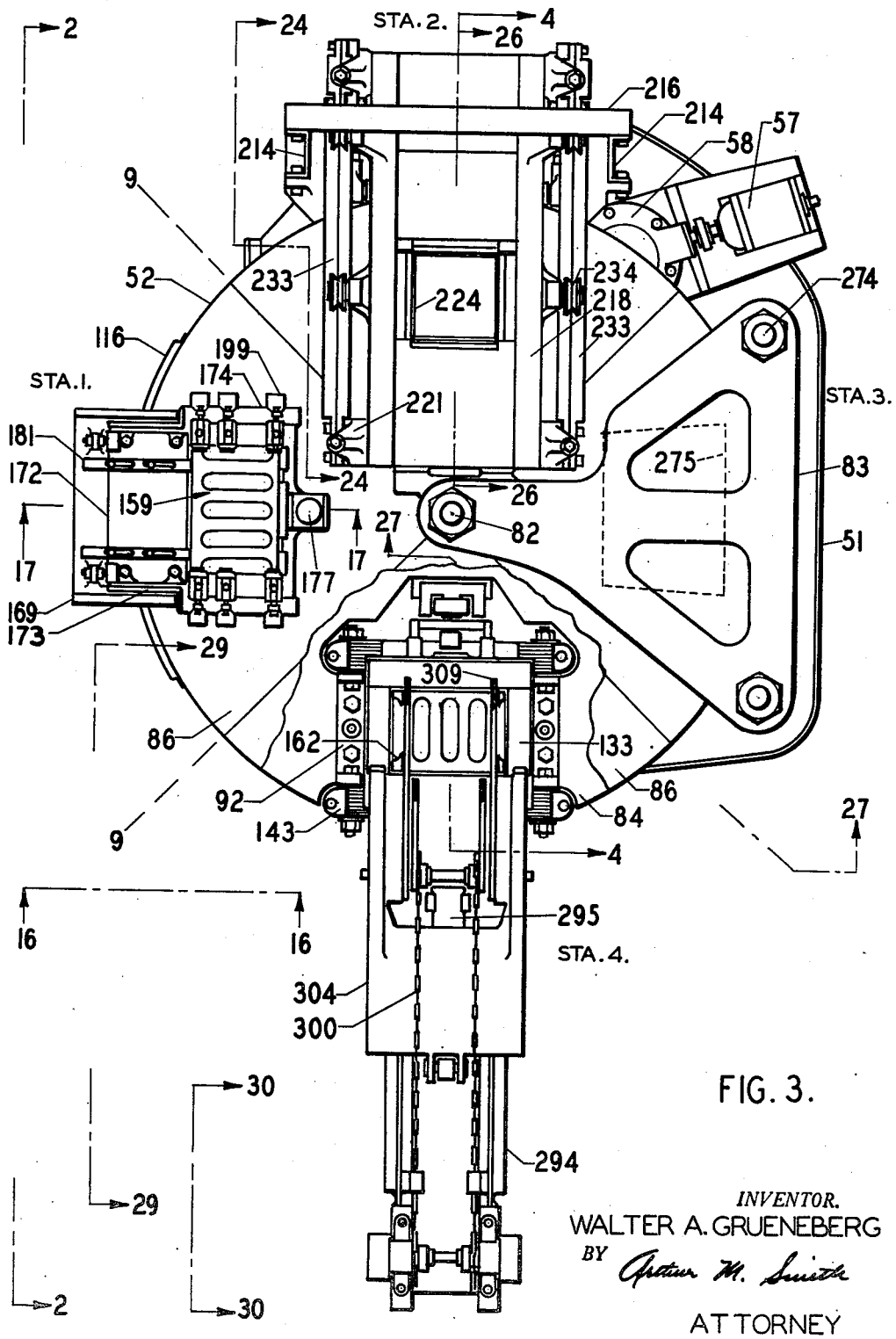
Fig. 3 is essentially a plan view of the machine shown in Fig. 2, turned through 180° and taken in the direction of the arrows 3—3 of Fig. 2.
Figure 9:
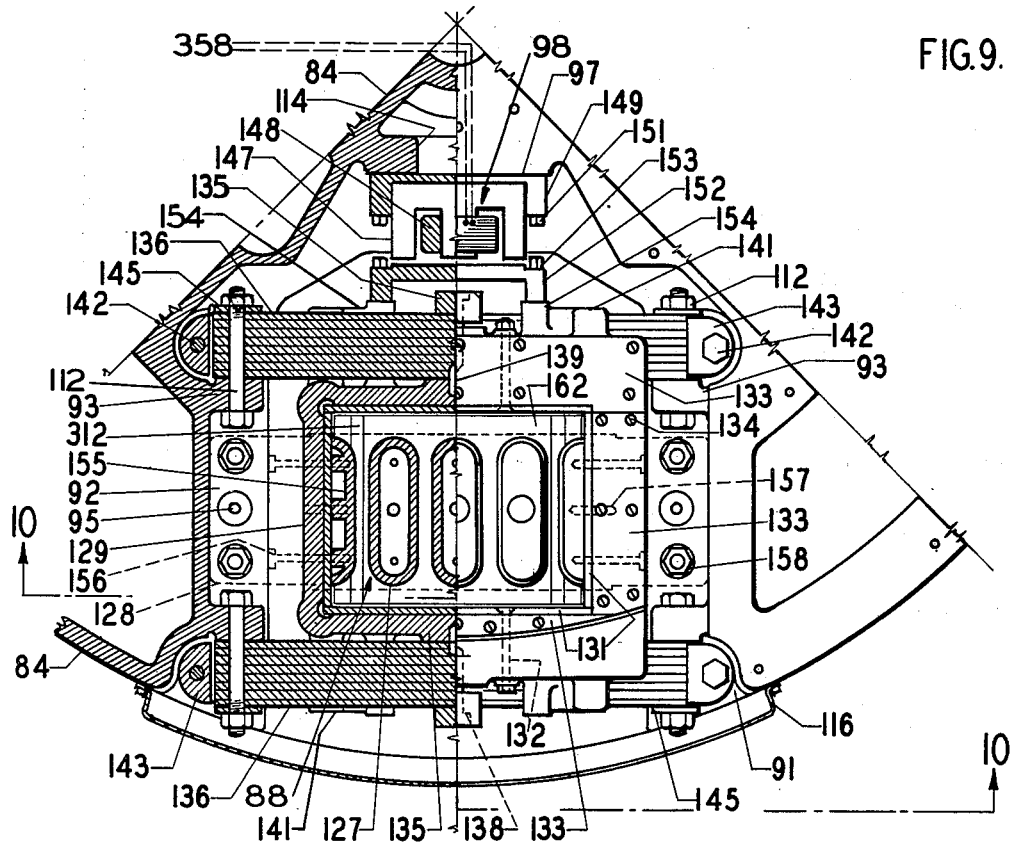
Figure 10:
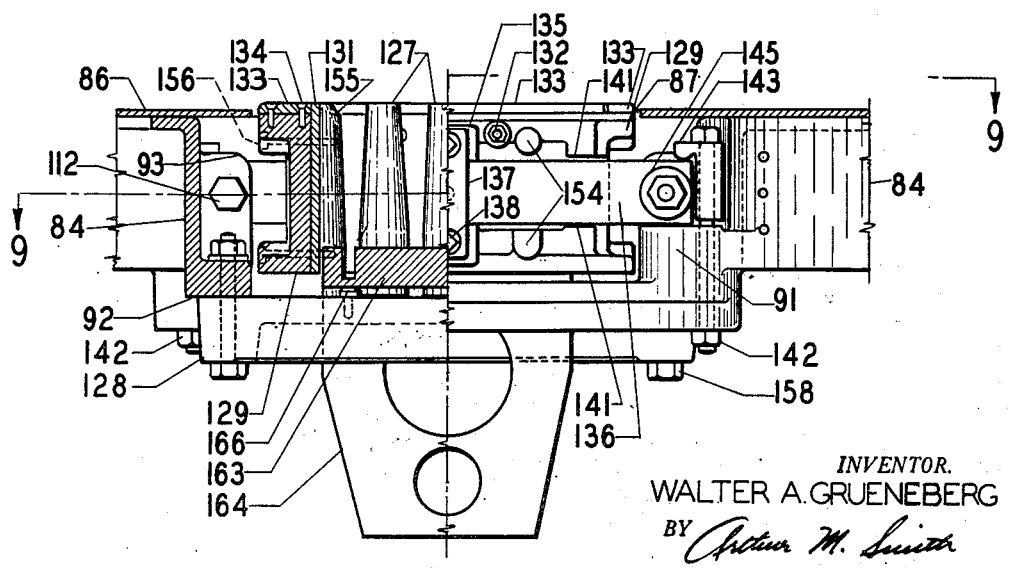

Fig. 9 is a detailed view of a one-quarter portion of the table indicated by the line 9—9 of Figs. 6 and 3, and taken in the direction of the arrows along the broken line 9—9 of Fig. 10, half of Fig. 9 being in horizontal section through the center of the mold box and one-half being in plan view with the table cover plates removed.

Fig. 10 is a view taken in the direction of the arrows essentially along the line 10—10 of Fig. 9, half of Fig. 10 being in vertical section and half being in front elevation with the guard plates removed.

Figure 11:
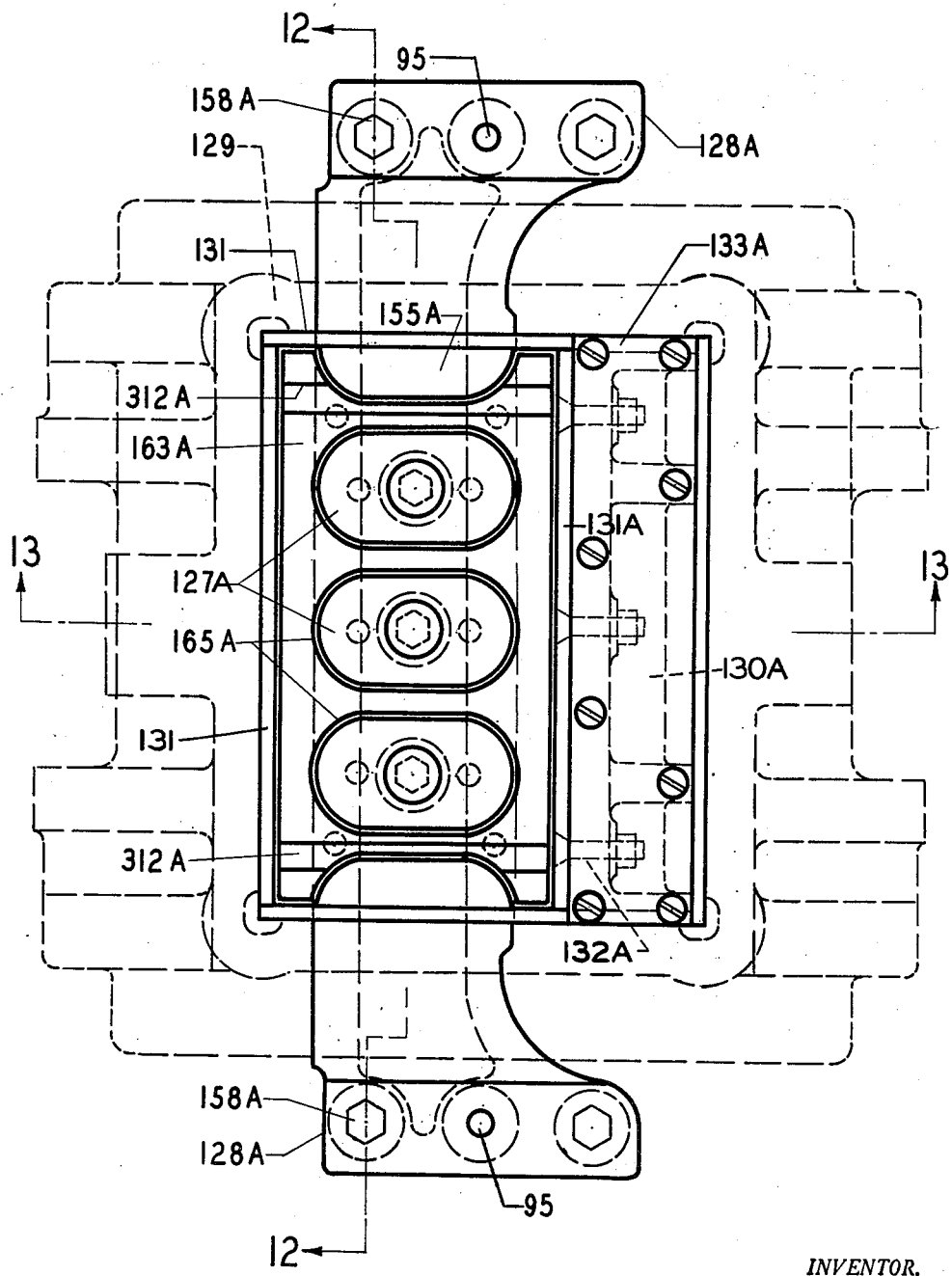

Fig. 11 is an enlarged plan view of the mold box structure employed in the present invention, showing an adaptation thereof to form a small-size concrete block, the adjacent table structure being shown in phantom.

Fig. 12 is a section taken in the direction of the arrows essentially along the line 12—12 of Fig. 11.

Fig. 13 is a section taken in the direction of the arrows essentially along the line 13—13 of Fig. 11.

Fig. 14 is a detail top view of a pallet embodying the present invention.

Fig. 15 is an enlarged vertical section taken in the direction of the arrows along the line 15—15 of Fig. 14.

Fig. 16 is a partial side elevation of the pallet feed station, taken in the direction of the arrows essentially along the line 16—16 of Fig. 3.

Fig. 17 is a vertical section of the pallet feeding mechanism, taken in the direction of the arrows essentially along the line 17—17 of Figs. 3 and 18.

Fig. 18 is essentially a top view of the pallet feed mechanism, taken in the direction of the arrows essentially along the line 18—18 of Fig. 19 and showing adjustment for small-size pallets, a portion of a large-size pallet being indicated by dashed lines.

Fig. 19 is a partial vertical section taken in the direction of the arrows essentially along the line 19—19 of Fig. 18.

Fig. 20 is an enlarged view showing features of the pallet chisel mechanism, taken in the direction of the arrows essentially along the line 20—20 of Fig. 18.

Fig. 21 is a view of essentially the same mechanism as shown by Fig. 20, but at a later stage of operation.

Fig. 22 is a view of essentially the same mechanism as shown by Figs. 20 and 21, but at a later stage of operation than shown by Fig. 21.

Fig. 23 is a view of the mechanism shown in Fig. 20, but at the completion of the pallet feed operation.

Fig. 24 is a partial side elevation of the concrete feeding mechanism, taken in the direction of the arrows essentially along the line 24—24 of Fig. 3.

Fig. 25 is one-half vertical section taken in the direction of the arrows essentially along the line 25—25 of Fig. 24.

Figure 26:
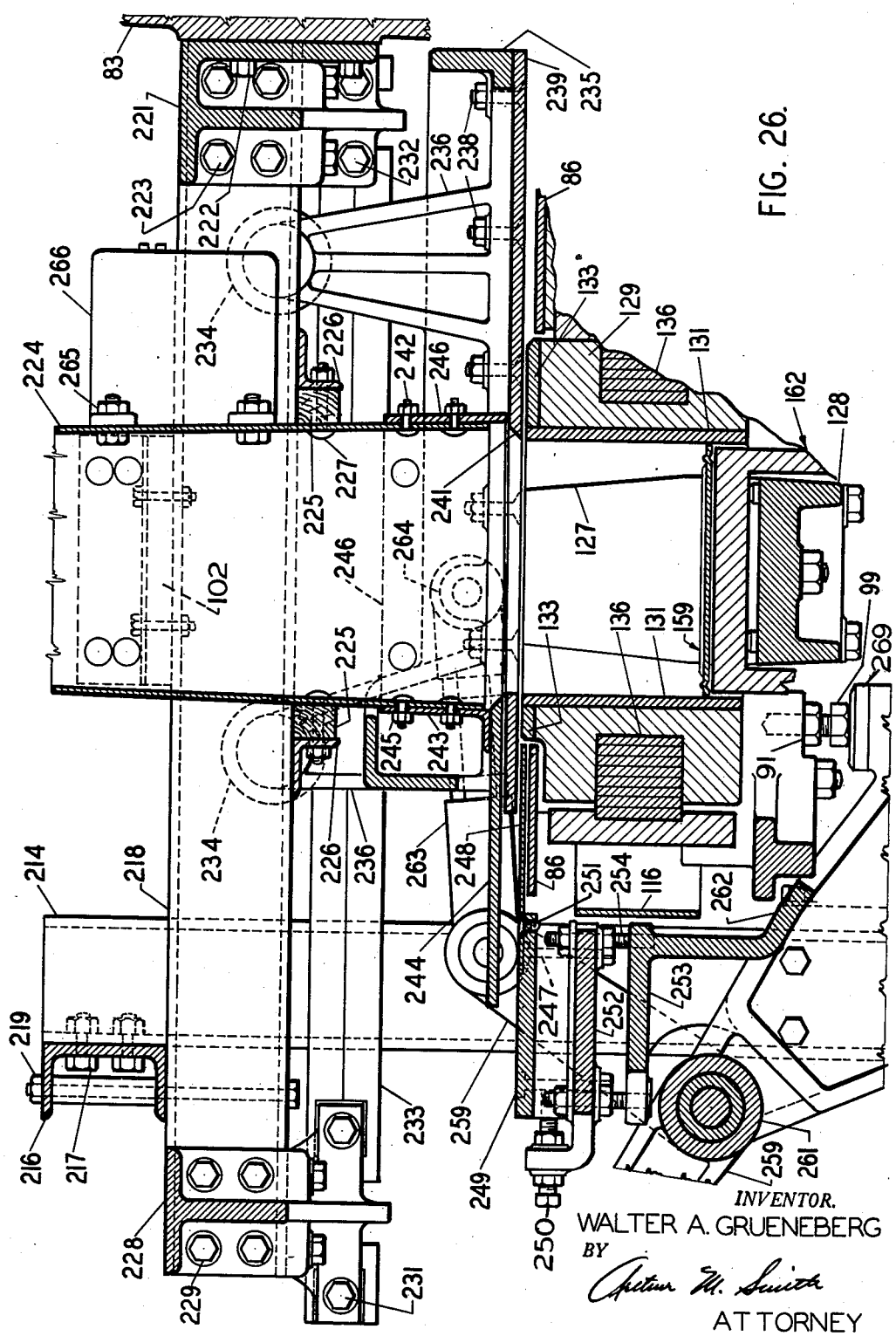

Fig. 26 is a partial vertical section through the concrete feeding mechanism, taken in the direction of the arrows essentially along the line 26—26 of Fig. 3.

Figure 27:
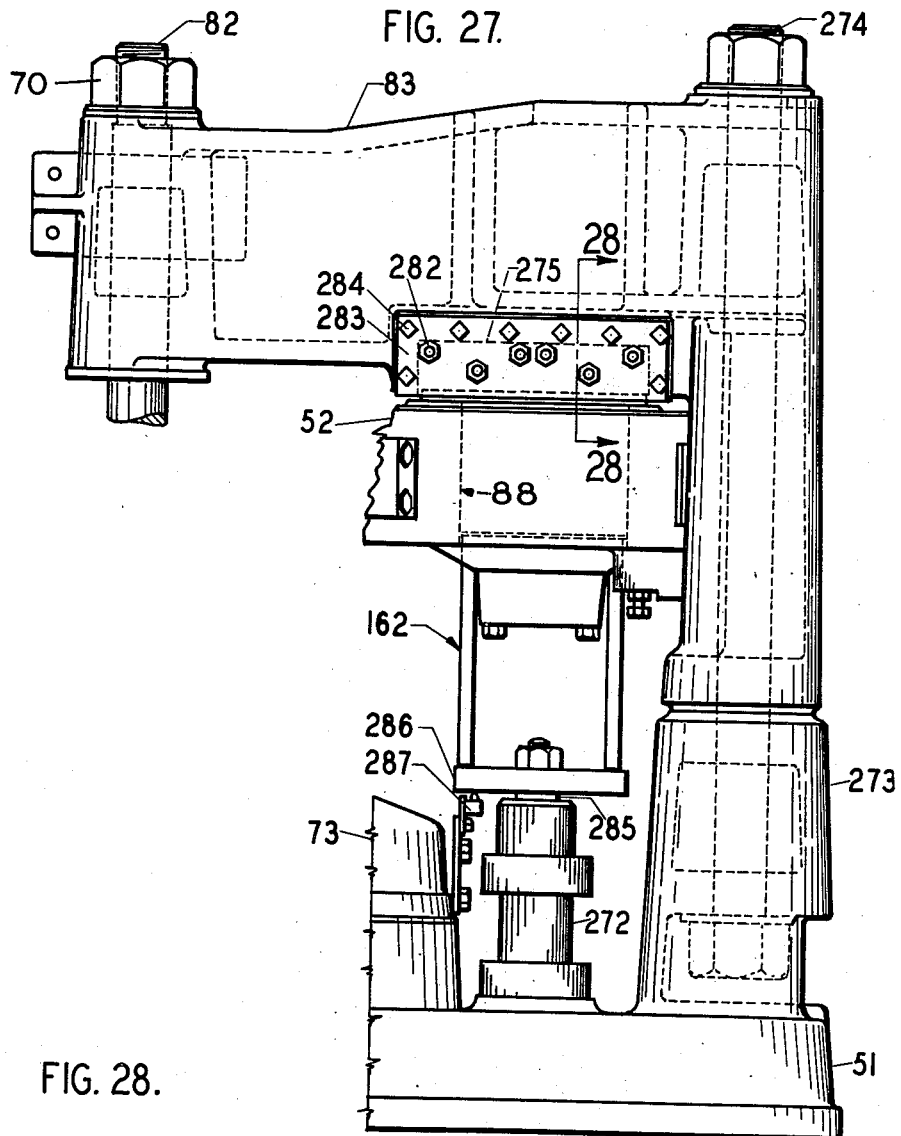

Fig. 27 is a partial side elevation of the concrete compressing mechanism, taken in the direction of the arrows essentially along the line 27—27 of Fig. 3.

Figure 28:
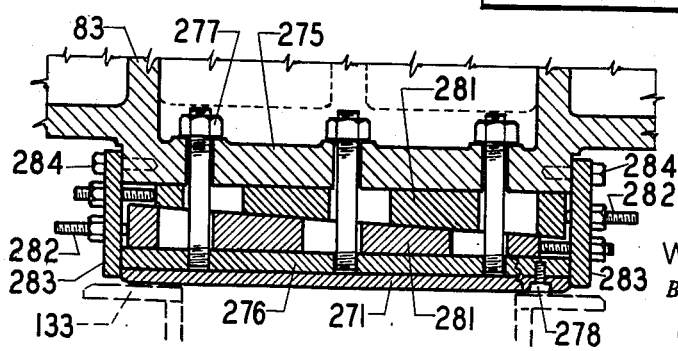

Fig. 28 is a vertical section view taken in the direction of the arrows essentially along the line 28—28 of Fig. 27.

Fig. 29 is a partial side view of the stripping mechanism, taken in the direction of the arrows essentially along the lines 29—29 of Figs. 3 and 31, the mold box being shown in section through the center line.

Fig. 30 is a continuation of Fig. 29 taken in the direction of the arrows 30—30 of Figs. 3 and 31.

Fig. 31 is a plan view of the stripping mechanism shown in Figs. 29 and 30.

Fig. 32 is a vertical section taken in the direction of the arrows essentially along the line 32—32 of Fig. 31.

Figure 33:
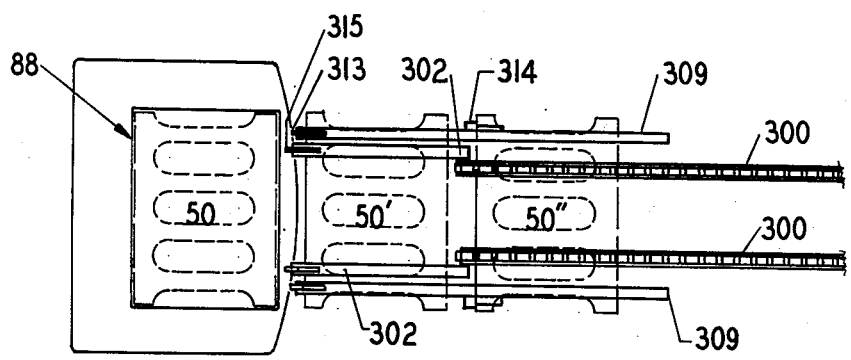

Fig. 33 is a partial plan view of the block carriage mechanism of the present invention at the beginning of the work cycle, the blocks being shown in phantom.

Figure 34:
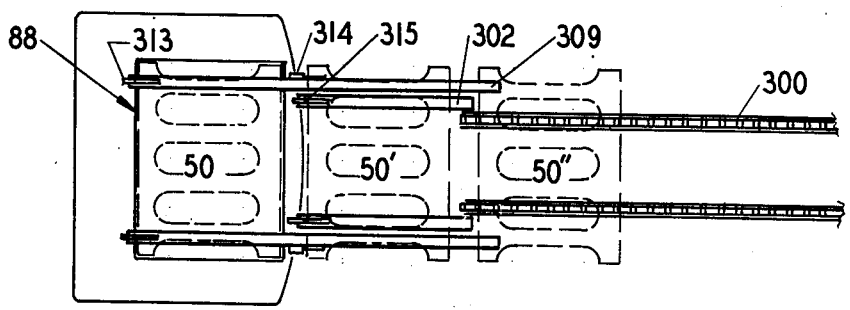

Fig. 34 is a view of the mechanism shown in Fig. 33, but at a later stage in the work cycle.

Figure 35:
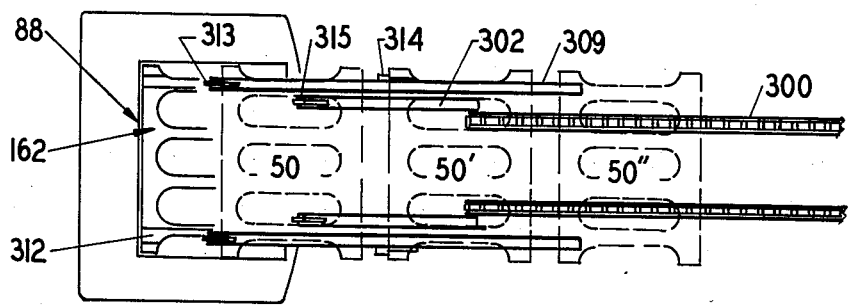

Fig. 35 is a view of the mechanism shown in Figs. 33 and 34, but advanced in the work cycle from Fig. 34.

Figure 36:
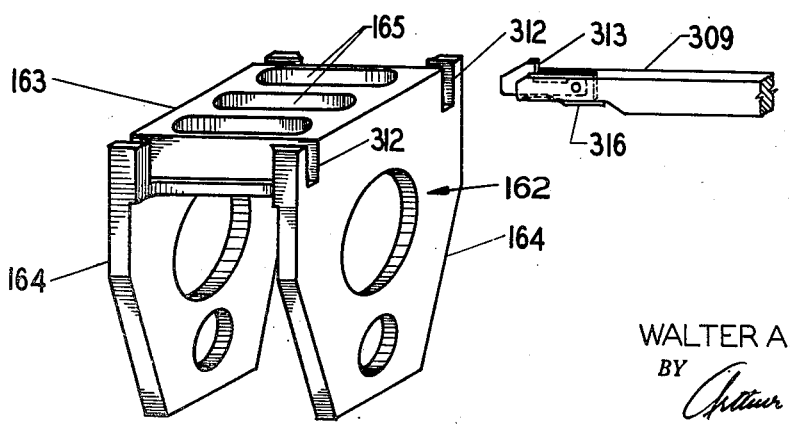

Fig. 36 is an isometric operational view of the stripper employed by the present invention, showing a pick-off arm about to enter a milled slot of the stripper.

Figure 37:
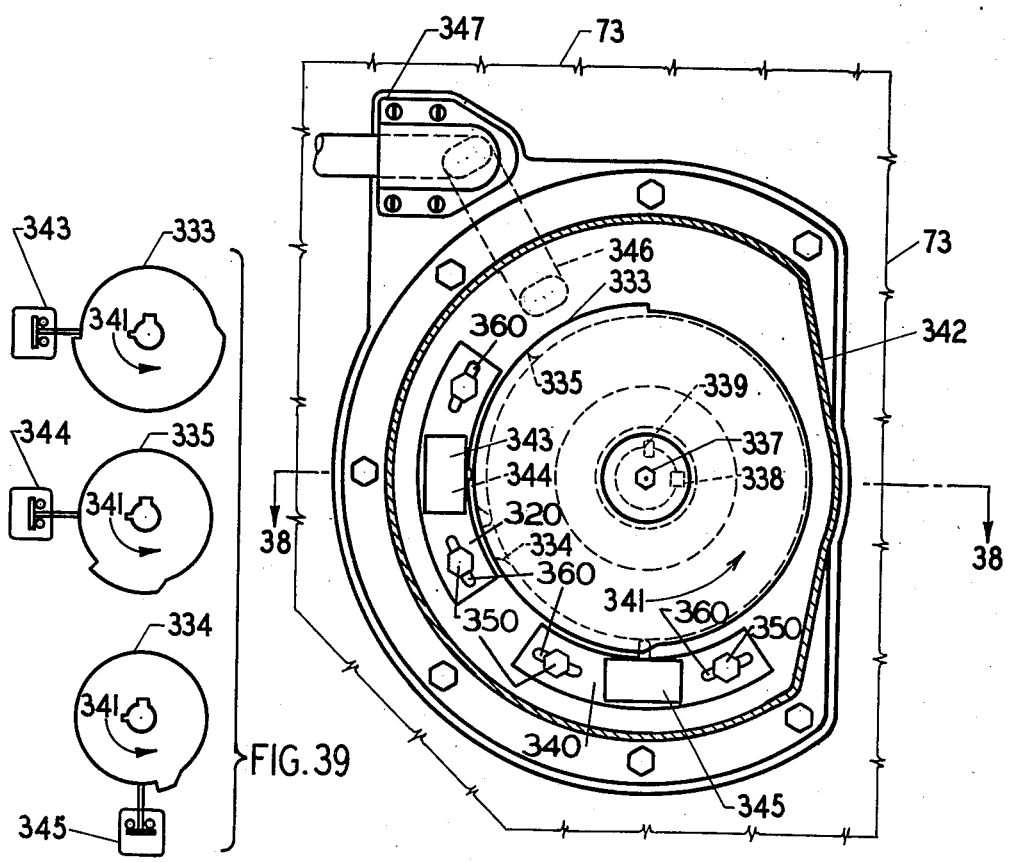
Figure 38:
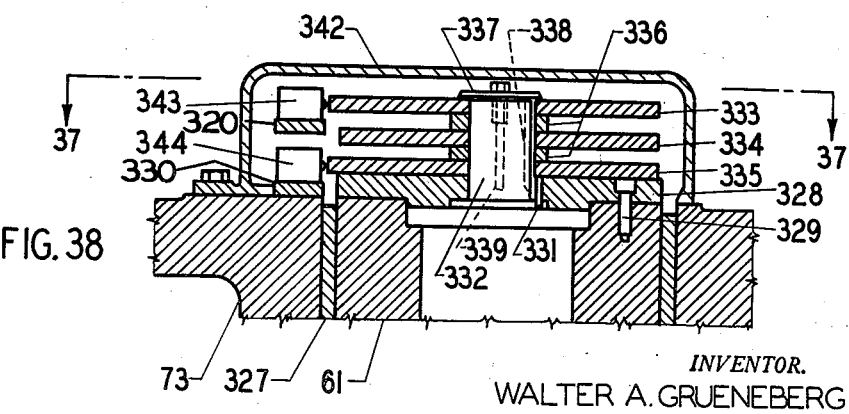

Fig. 37 is a top view of the timing cam assembly of the present invention, taken in the direction of the arrows essentially along the line 37—37 of Fig. 38.

Fig. 38 is a vertical section of the timing cam assembly, taken in the direction of the arrows essentially along the line 38—38 of Fig. 37.

Fig. 39 is a diagrammatic view of the cams and switches in the timing cam assembly shown in Figs. 37 and 38.

Figure 40:
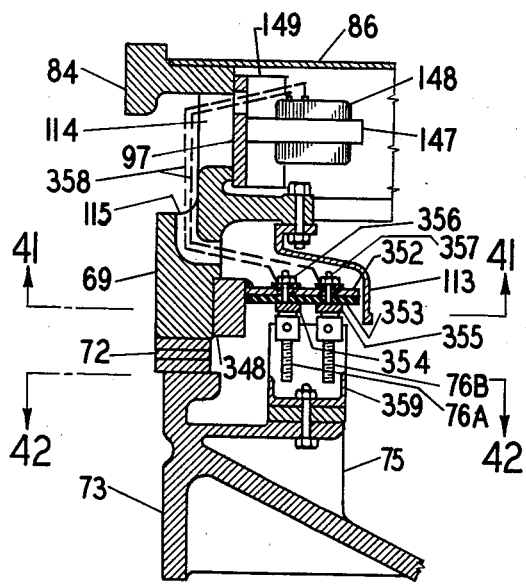

Fig. 40 is an enlargement of the distributor ring assembly employed in the present invention.

Figure 41:
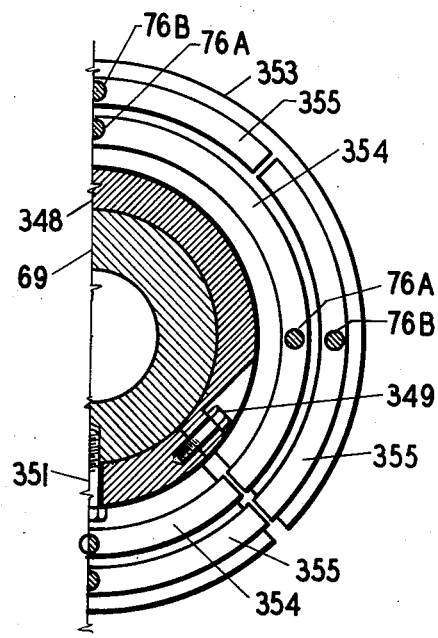

Fig. 41 is a one-half horizontal section taken in the direction of the arrows essentially along the line 41—41 of Fig. 40.

Figure 42:
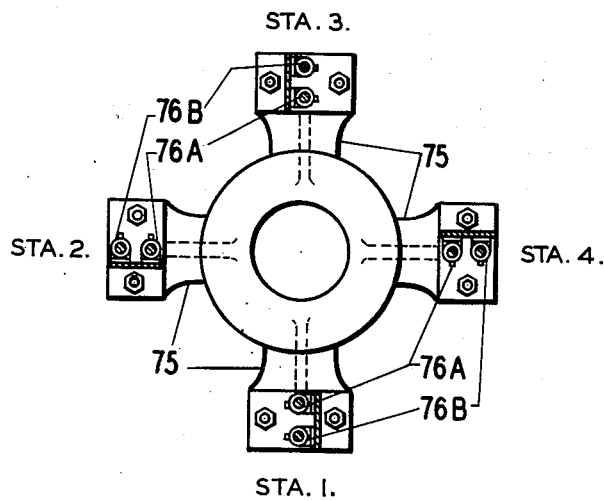

Fig. 42 is a view of the bracket supports for the distributor ring brushes at the four work stations, taken in the direction of the arrows essentially along the line 42—42 of Fig. 40.

Figure 43:
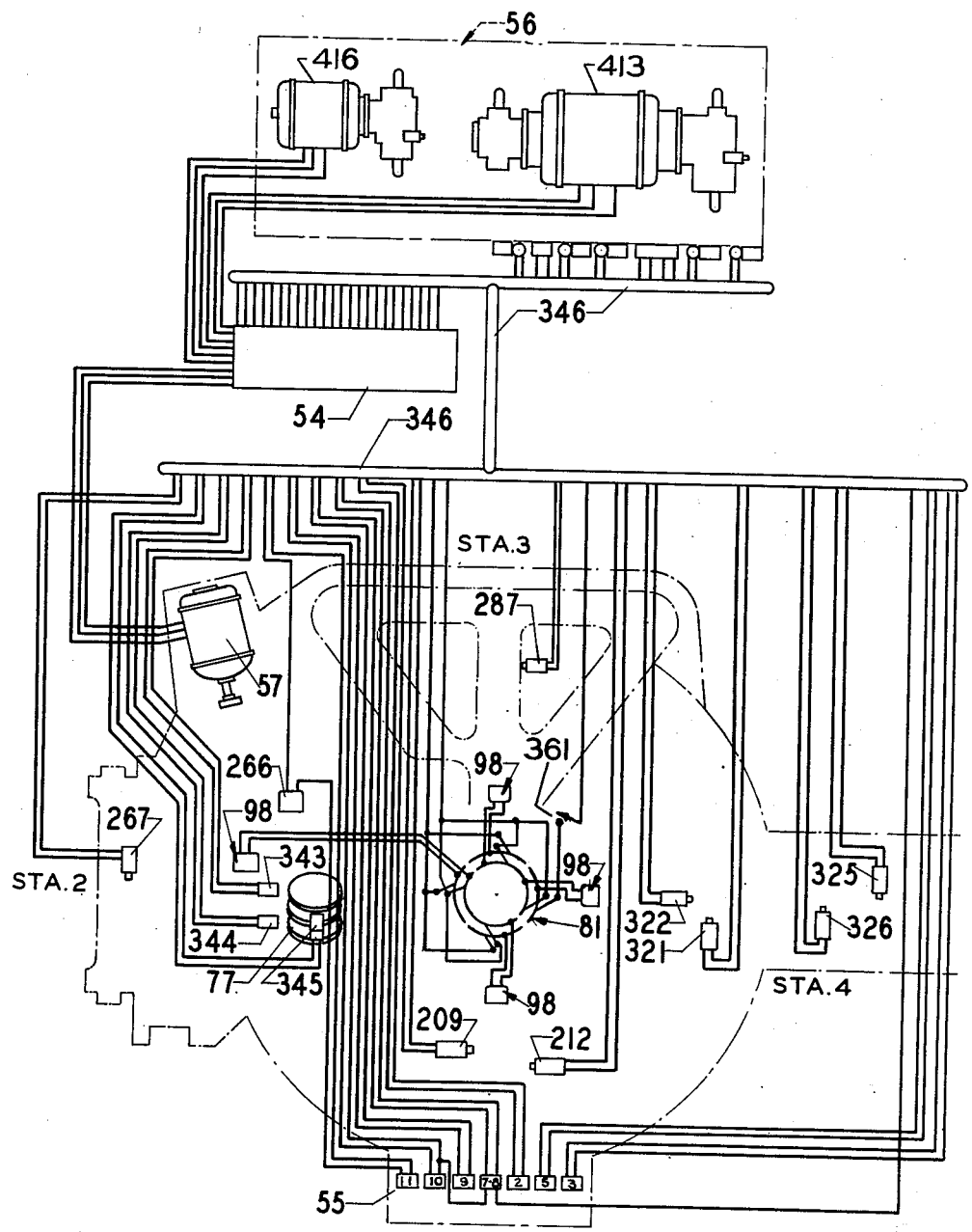

Fig. 43 is a schematic plan of the electrical wiring for the present invention and superimposed on a phantom plan view of the machine.

Figure 44:
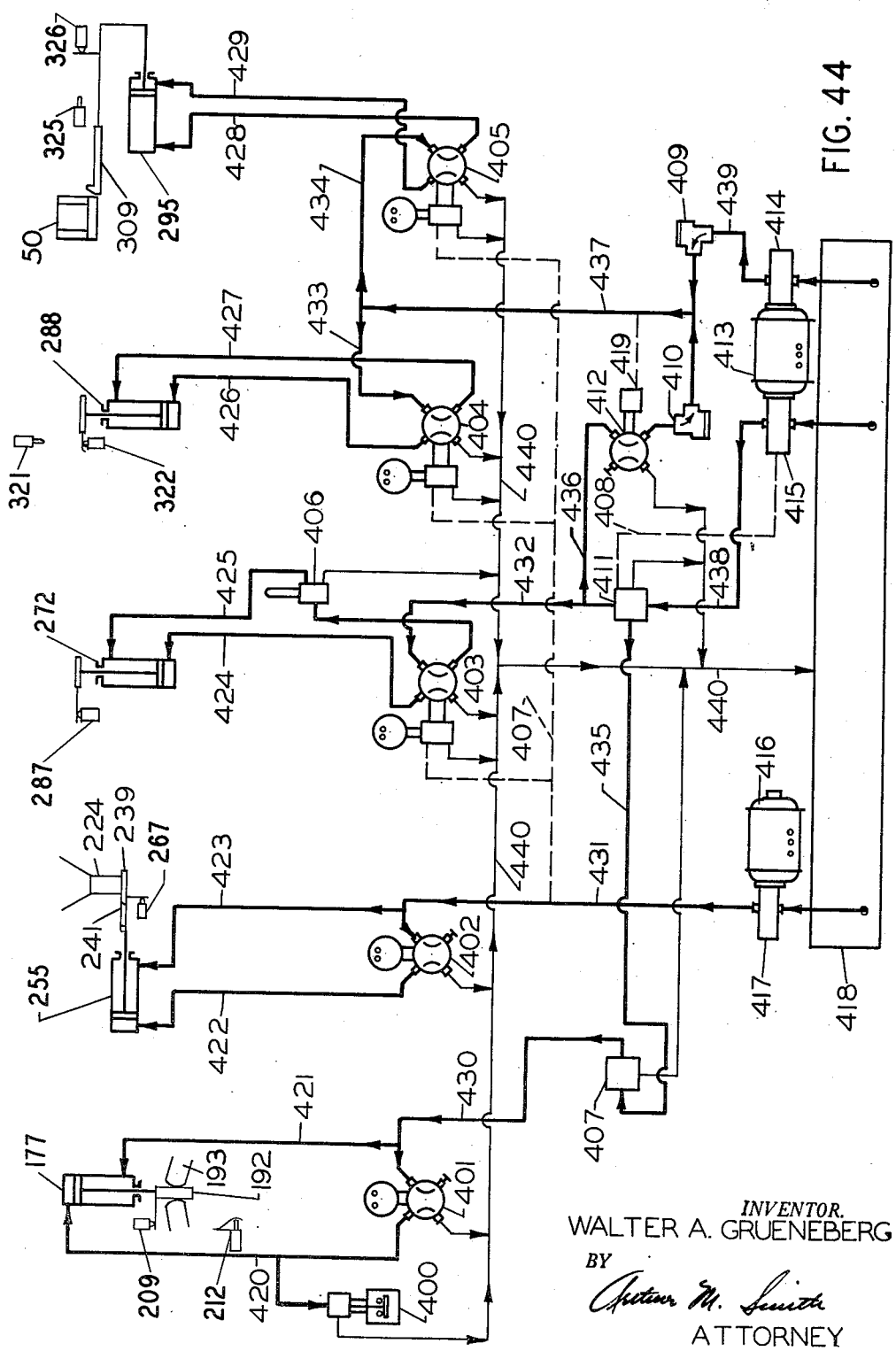

Fig. 44 is a schematic diagram of the hydraulic system used with the present invention.

Figure 45:
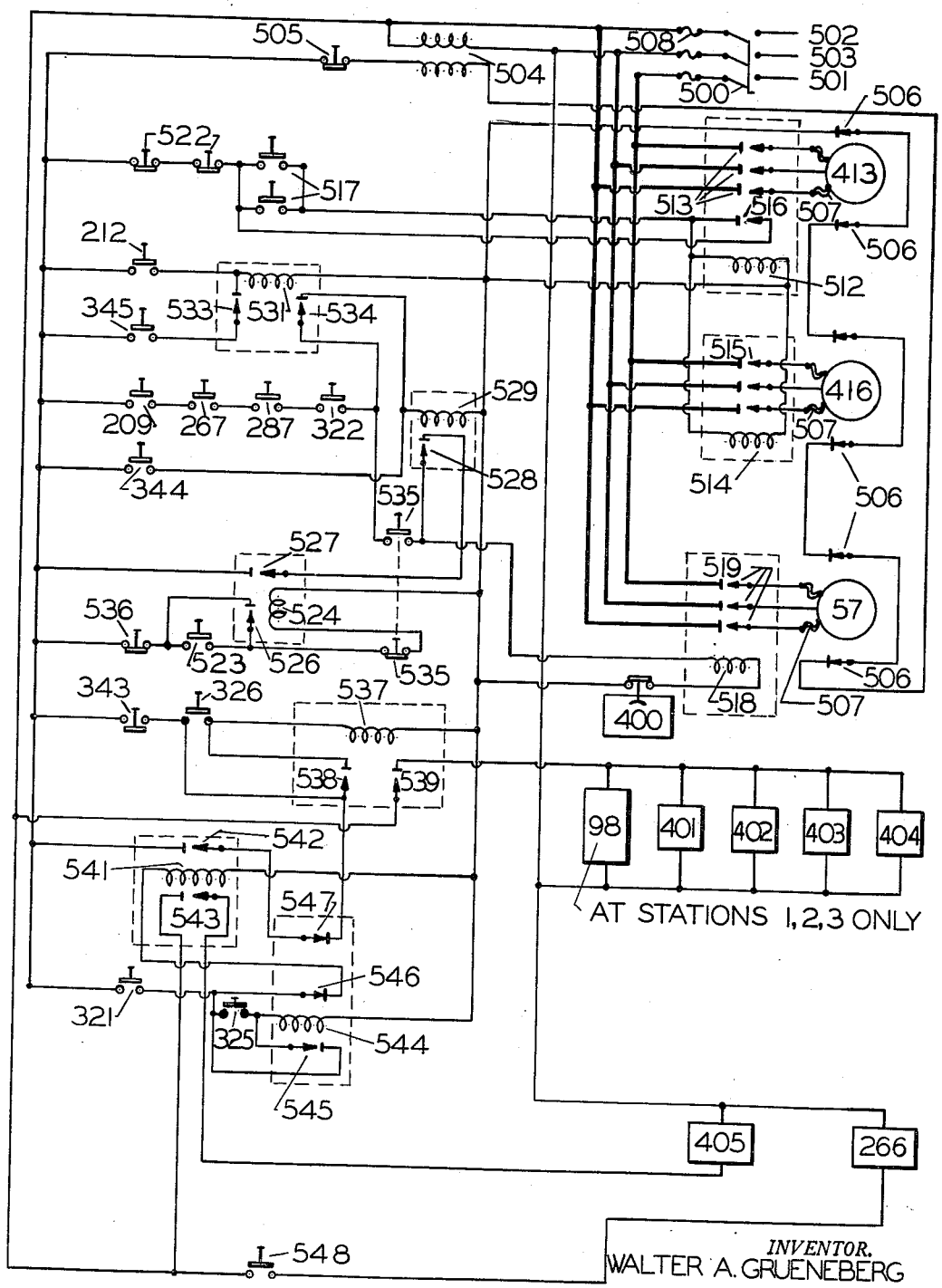

Fig. 45 is a schematic wiring diagram of the electrical power and control circuit used with the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Section I.—General

The present invention will be hereinafter described, by way of example but not of limitation, as embodied in a molding machine which utilizes the process of the present invention and carries out in automatic succession the various steps in the manufacture of a structural building unit in the form of a block (Fig. 1) from a plastic mix of water, cement and an aggregate, it being understood that any other desired shape of such unit or any other desired material may be similarly made and utilized without departing from the spirit of the present invention.

Four stages in the operation of the machine are associated respectively with four fixed work stations located about the four quadrants of a rotatable table. Four mold boxes symmetrically mounted in the top of the table are carried progressively by rotation of the table from one station to the next during intermittent indexing cycles of the machine. It is to be understood however that any desired number of stages, work stations and mold boxes may be employed without departing from the present invention. Between the intermittent indexing cycles, the machine is stationary for a period of time denoted the work cycle. During the work cycle a mold box is located at one of each of the four stations and each mold box partakes in the stage of operations particular to its station. The continuous action of the machine may be understood by following a single mold box through a complete cycle of the four stations.

At station 1 a mold box having its inner surface shaped to form the outer surface of the completed block and containing the cores which shape the hollow spaces within the block is provided with a pallet which forms the floor of the mold box and which is supported by a rigid platform called the stripper. The molded but uncured block may be transported on the pallet without distortion or breakage.

At station 2 the mold box is filled with a concrete mix and concurrently vibrated to insure even flow of the mix around the cores to completely fill the mold. By a unique mounting of the mold box, the vibration of this and successive stages is prevented from transmission to the machine structure.

At station 3 the concrete mix within the mold box is compressed concurrently with additional vibration of the mold box to remove entrapped air and to insure uniform density of the mix.

At station 4 the compressed but uncured block is removed or "stripped" from the mold box and conveyed to a delivery position on the machine, from which position the block is removed from the machine and delivered while still on its pallet to the curing equipment or storage platform as desired.

In view of the symmetry in the construction and operation of the four quadrants of the table, a multiplicity of reference numbers will be avoided by limiting the following discussion as much as practicable to a single quadrant and by using identical reference numbers to denote corresponding features of the four quadrants. In the description below a single quadrant of the table and its appurtenances will be followed through a complete cycle of the block-making machine. It will be understood that the other three quadrants of the table are essentially identical in construction and operation and follow through consecutively after the manner of the quadrant described.

Referring to the drawings for details of construction, Fig. 1 shows an example of the block 50 which is produced by the machine of the present invention. Figs. 2 and 3 show a general assembly of the machine wherein a base 51 supports the table 52 and the table drive mechanism. Separate from the base 51 are a concrete hopper 53 for supplying mixed concrete to station 2, a control panel 54 in which are mounted the electrical controls, a switch panel 55 near station 1, and the assembly of hydraulic pumps, valves, and storage tanks 56. (See also Fig. 43.)

Reference to the location of the various electrical and hydraulic elements will be made as they are encountered in the discussion of the mechanical operation of the machine, but details of their operation will be reserved until the description of the mechanical features of the machine is completed.

Section II.—Table and drive

Figure 4:
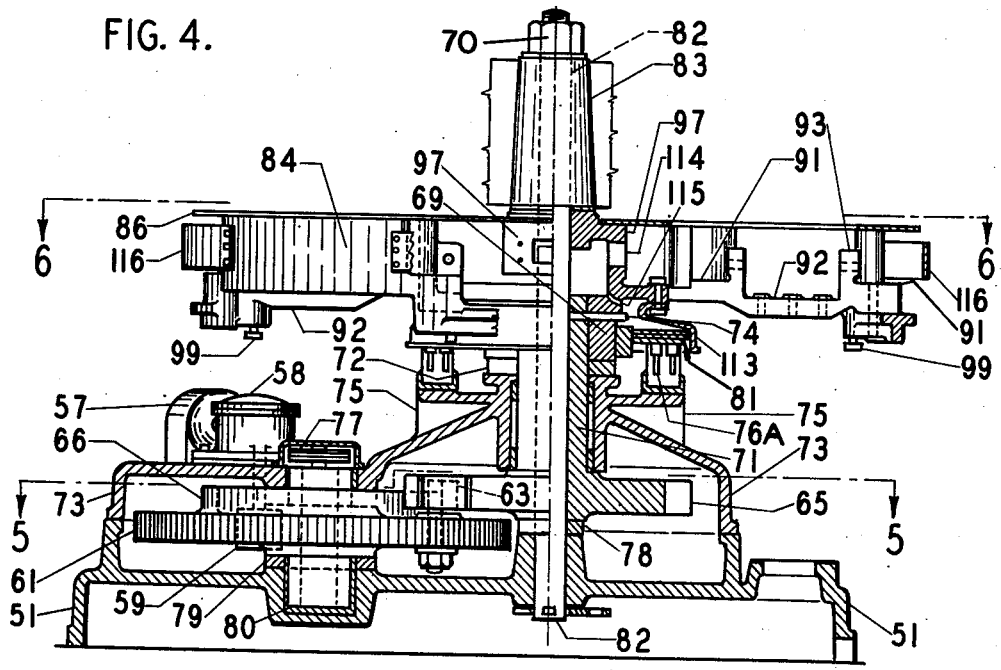
Fig. 4 is partial vertical section taken in the direction of the arrows essentially along the line 4—4 of Figs. 3, 5 and 6, portions of the table and table drive mechanism being shown in side elevation.
Figure 5:
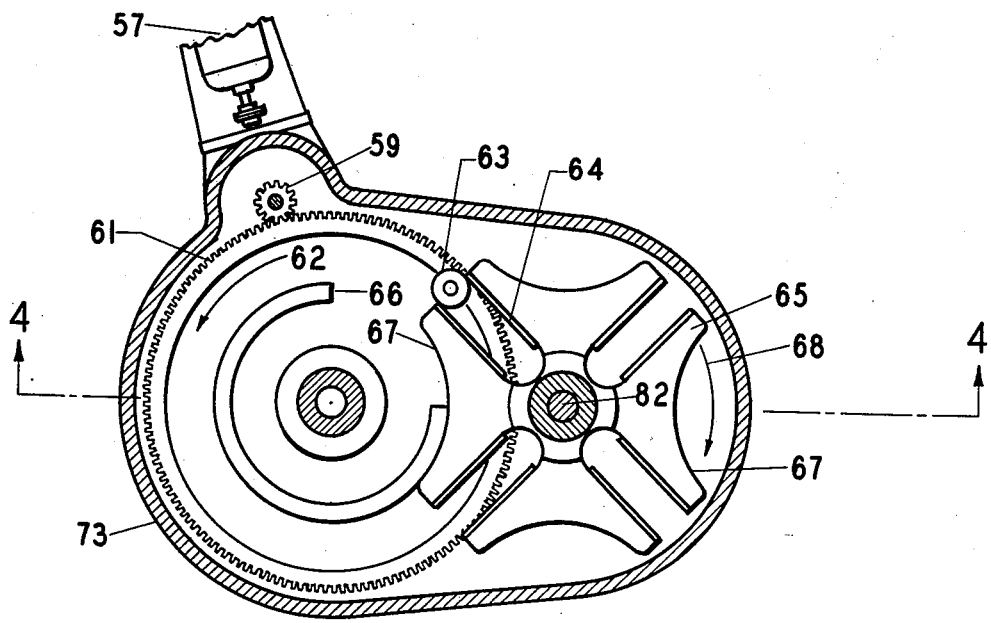
Fig. 5 is a partial horizontal section taken in the direction of the arrows essentially along the line 5—5 of Fig. 4 and showing portions of the table drive mechanism in plan view.

Referring to Figs. 4 and 5, the electric motor 57 drives the table 52 by means of the variable speed gear reducer 58 which is operatively connected between motor 57 and pinion gear 59 to drive the bull gear 61 in the direction of arrow 62. Attached to the bull gear 61 is the roller drive pin 63 which engages each of the four slotted openings 64 in turn to rotate the Geneva cam 65 during the indexing cycle. A Geneva lock engagement, which locks the Geneva cam 65 in position during the work cycle is completed by interaction between the C-shaped boss 66, which is raised from the bull gear 61 and is concentric therewith, and the arcuate surface 67 of the Geneva cam 65.

Figs. 4 and 5 show the beginning of the work cycle at the moment roller pin 63 leaves the Geneva slot 64. During the work cycle the Geneva cam 65 is held stationary by the Geneva lock until the bull gear 61 completes essentially three-quarters of a turn and the roller pin 63 reaches the point of entry to the next slot 64 to mark the end of the work cycle. The Geneva cam 65 will then be free to turn and to rotate through 90° in the direction of the arrow 68 as the roller pin 63 enters the next slot 64 and emerges therefrom at the beginning of the next work cycle, Fig. 5. The process is repetitive with each complete rotation of the bull gear 61.

An extended under hub 69 of the table 52 fits over the upper hub 71 of the Geneva cam 65 and rests on the thrust bearing 72, thus carrying the weight of the table 52 to the table drive cover 73 which in turn is secured to the base 51. The table hub 69 is keyed at 74 to the Geneva cam hub 71 so that actuation of the Geneva cam 65 rotates the table 52.

The advantages of the simplicity and effectiveness of the Geneva cam and lock to provide intermittent rotation and locking of the table 52 are more fully realized in view of the weight of the table 52, which in the present embodiment is approximately three tons. The Geneva lock is self-timing to bring itself into operation at the moment the table 52 has indexed 90°, thus preventing over shooting of the table 52 under its own momentum. It is also to be noted that the essential features of the operation described are not limited to a four-arm cam 65 nor to a single drive pin 63. Provision for more or less than four work stations, and the relative proportions of time allowed for the indexing and work cycles, are provided for by suitable selection of the number of arms of the Geneva cam 65 and the number and spacing of the drive pins 63. The raised boss 66 will accordingly be divided into a plurality of spaced portions to accommodate a plurality of roller pins 63.

Four brackets 75 secured to the table drive cover 73 are positioned 90° apart around the table hub 69 so that each bracket supports a pair of brushes 76A and 76B, which pair of brushes make electrical contact at their respective work station with the distributor ring assembly 81. (See also Fig. 42.) The protecting cover 113 for the assembly 81 is attached to and rotatable with the table hub 69. The four passages 114 and four passages 115 in the table hub 69 are provided for the electrical connections from the four pairs of brushes 76A and 76B. Attached to the top of the bull gear 61 for rotation therewith is the timing cam assembly 77. (See also Fig. 42.)

Thrust bearing 78 carries the weight of the Geneva cam 65 and thrust bearings 79 and 80 carry the weight of the bull gear 61. The vertical stationary shaft 82, around which both the Geneva cam 65 and table 52 rotate, is supported at its lower end by the base 51 and at its threaded upper end by the helmet 83 and master nut 70.

Fig. 6 shows the construction and arrangement of the table 52 as seen from above. The casting 84 forms the table top frame work. Fastened to the top of the table 52 by the plurality of the cover plate screws 85 are four steel cover plates 86, each of which occupy essentially a quadrant of the table top. Parts of the plates 86 are broken away in Fig. 6 to show construction of the casting 84.

Each cover plate 86 has an opening 87 above its respective mold box 88, the latter being shown generally as the rectangular enclosure within the four plates 131, Fig. 9. The top of the mold box 88 essentially fills the opening 87 except for a small clearance. Below each cover plate opening 86 is the opening 89 in the table casting or frame 84. Around each of the openings 89 at essentially the four corners thereof and formed as part of the casting 84 are the four pads 91. (See also Fig. 8.) Likewise as part of the table casting 84 and displaced between each pair of pads 91 on each side of the mold box 88 are the pad 92 and the two lugs 93, one lug 93 on each side of each pad 92. Each pad 91 contains the vertical bolt hole 94. Within each pad 92 are the vertical alignment hole 95 and two bolt holes 96, one bolt hole 96 on each side of each alignment hole 95. Also formed as part of the casting 84 and displaced between two of the pads 91 at the rear of each mold box 88 (centerward on the table 52) is the vertical surface 97 to which is bolted the electric vibrator 98, Fig. 9.

Fig. 8 shows a detail of one of the supporting pads 91 and a portion of the adjoining pad 92. Threaded into the underside of each of the pads 91 at the periphery of the casting 84 is the short leg 99 which bears on a projection at station 2 to help support the table 52 during the time the concrete block 50 is being "stripped" at station 4. A horizontal bolt hole 111 is provided in each lug 93 for the spring retaining bolts 112, Fig. 9.

On the circumference of the table 52 are the four guard bands 116, one fastened across the front of each opening 89. The function of the various bolts, bolt holes and other parts mentioned above will be discussed in detail as the operation of the machine is described below.

Fig. 7 shows an enlarged detail as seen from above of the novel key assembly 74 employed to lock the table hub 69 to the Geneva cam hub 71. By reason of the weight of the parts involved, amounting to several tons, it is necessary to eliminate play and to prevent shearing of the key assembly 74 under the intermittent starting and stopping action of table 52. The key assembly 74 is designed to compensate for any play existing initially or that might result from wear between the parts involved. The keyway 117 is first aligned by adjusting the hubs 69 and 71. Then the two essentially identical key components enter the slot 117 from opposing sides of the shaft 82. Identical reference numbers identify corresponding parts of the two key components, one component being in plan view and the other being in horizontal cross-section. The wedge 121 and the bolt 122 are placed in the key slot 117 first, followed by the locking piece 123 which is bolted by the bolt 124 to the table hub 69. The clamping piece 125 is then inserted and the bolt 122 tightened by the nut 126 to pull wedge 121 and clamping piece 125 together and force the wedge 121 and locking piece 123 tightly against opposing sides of the keyway 117.

Section III.—Mold boxes

One quarter of the table 52 with its mold box 88 is shown in Fig. 9 wherein the right half is a top view with steel cover plates 86 removed for clearness and the left half is a horizontal section through the center of the mold box 88. Fig. 10 is a front view of the portion shown in Fig. 9, the right half being an elevation with the guard band 116 removed for clearness and the left half being a vertical section through Fig. 9 along the line 10—10 which sections the mold box 88 immediately in front of the cores 127 and their supporting means or core bridge 128.

The mold box 88 consists of a cast box 129 and the steel lining 131 secured to the vertical sides of the casting 129 by the plurality of screws 132. The top of the casting 129 is covered by the rectangular plate collar formed from four wear plates 139 which are secured to the casting 129 by the plurality of screws 134. The wear plates 133 provide a horizontal surface which extends slightly vertically into the top of the opening 87 and horizontally covers opening 87 except for a small clearance around the periphery thereof and the rectangular opening within said plate collar formed by said wear plates 133, the rectangular opening to the top of the mold box 88.

The front and rear center portions of the outside of the casting 129 is shaped to provide the two pads 135, each of which is recessed to receive a set of leaf springs 136. The spring leaves 136, having their individual leaves in vertical planes, are securely held at their central portions to the pads 135 by the clamps 137 and the bolts 138. The assembly described forms the only support for the mold box 88. Pins 139 extend into the mold box pads 135 and through two leaves of the spring 136 to prevent lateral movement of the mold box 88 along the springs 136.

Also as part of the mold box construction are four pairs of pads 141, one pair extending from near each end of the front and rear of the cast box 129. The pads 141 extend in pairs under the springs 136 to prevent the mold box 88 from moving vertically during times of additional stress, such as during stripping. Mold box 88 is free to move in a horizontal plane during the vibration period.

The ends of each leaf spring 136 rest on and are supported by the top surfaces of the pads 91 of the table casting 84. The bolt 142 extends through the clamp 143 and the hole 94 of the pad 91 (see also Fig. 8) and is tightened to prevent vertical movement of the end of spring 136. Horizontal movement of each end of spring 136 is prevented by securely bolting it to the vertical face of the lug 93 by the bolt 112 which extends through the spring 136, the steel washer 145, and the hole 111 in said lug 93.

It is thus seen that due to the mounting of the mold box 88 on the springs 136 in the manner described, mold box 88 is free to vibrate independently of table 52 from front to rear in a horizontal plane but in no other direction.

The vibration of mold box 88 is achieved by the electric vibrator 98 comprising the core 147 and a coil 148 which are both rigidly fastened to the vibrator frame 149, the latter being bolted to the vertical surface 97 of the table casting 84 by the plurality of bolts 151. A second core 152 is rigidly bolted to the rear of casting 129 by the bolts 153 secured in the pads 154 of the rear portion of the mold box casting 129. It is noted in Fig. 10 that pads 154 are on the front of casting 129 also and that in all other respects the front and rear portions of castings 129 are symmetrical so that there is no danger in installing castings 129 backward. Alternating current flowing through the coil 148 sets up an intermittent magnetic attraction between the cores 147 and 152 so as to impart a vibration to the mold box 88. The vibration is regulated by controlling the frequency and amplitude of the alternating current.

The manner of mounting the electromagnetic vibrators 98 and the mold boxes 88 provides adequate vibration to settle the concrete within the mold box and to densify said concrete by the elimination of gas bubbles. It has been found that horizontal vibration of the mold box 88 is more effective than vertical vibration in transferring vibrations of high frequency and small amplitude to the concrete within the mold box 88. The vibrating side walls of the mold box 88 exert positive alternating compressional forces on the concrete between said side walls, and the stationary tapered core 127 within the box. If the mold box 88 is vibrated vertically, the compression of the mix occurs chiefly during the downward motion of the concrete within the mold box 88 since the cores 127 must be tapered to permit stripping of the molded block and do not provide the resistance to the vertical movement of the mix to cause its compression in an upward vertical direction. At high vertical vibration frequencies of the mold box 88, substantial vibration of the concrete also is dampened by the inertia of the mass. Thus the vertical vibrational energy required to obtain a predetermined vibrational compression effect on the concrete within the mold box 88 is considerably greater than the horizontal vibration energy required for an equivalent effect. For this reason, in order to obtain equivalent effects on the concrete within the mold box 88, the transfer of objectional vibration from the mold box 88 to the body of the machine will be greater when the mold box 88 is vibrated vertically than when the mold box 88 is vibrated horizontally.

Another advantage of the electromagnetic vibrators, the mounting of the mold boxes 88 for horizontal vibration, and their symmetric disposition around the table 52 is that the mold boxes on opposite sides of the table may be caused to vibrate in a suitable phase relationship with each other so that inadvertent vibration transferred to the table 52 or to the machine structure from one mold box 88 will be essentially neutralized by the vibration of the diametrically opposed mold box 88.

Adjacent to the steel lining 131 on the inside of the mold box 88 at each end are the two half-cores 155, each rigidly bolted and aligned to the cast box 129 by the plurality of bolts 156 and alignment pins 157. The bolts 156 also secure the two end plates of the steel liner 131 to the casting 129.

In the central part of the mold box 88 are three cores 127 which form the holes in the block 50, Fig. 1, and which are rigidly attached to and are supported by the core bridge 128 extending across the opening 89 in the table casting 84, Fig. 6, beneath the mold box 88. The core bridge 128 is bolted at each end to the table 52 at the under side of the pads 92 by the bolts 158 which extend through the holes 96 in the pads 92, Fig. 8. Thus the core bridge 128 is entirely free of the mold box 88. The central holes 95 in the pads 92 are for alignment pins only.

Figs. 14 and 15 show a detail of the pallet 159 with the core holes 161, the mortar grooves 167, and chamfered ends 168. The pallet 159 is shaped to form the contour of the bottom of the block 50 and to be flat at the bottom of the mold box 88 so as to fit within the periphery of the mold box 88 and around the cores 127 and 155 with a small clearance. The mortar grooves 167 are ridges in the top surface of pallet 159 which leave grooves in the bottom of the finished block 50 for the purpose of receiving mortar and binding the block 50 in place when it is finally used in construction. Each ridge 167 in the top surface of the pallet 159 is associated with a groove in the bottom surface, allowing the pallets 159 to be easily aligned in tongue and groove relationship when they are piled one on top of another at the pallet feed station 1.

Pallet 159 is dropped from the pallet feeding mechanism at station 1 into the top opening of the mold box 88 and rests at the bottom of mold box 88 on the horizontal flat plate 163 of the stripper 162. Fig. 36 shows a detail of the stripper, shown generally as 162, with its core holes 165 which allow it to fit loosely in the core box 88 around the cores 127 and 155 and upon the plurality of adjustable pegs 166, Fig. 10. The plugs 166 are adjustably secured to the top of the core bridge 128 so as to allow regulation of the rest position of stripper 162 to obtain the proper depth of mold box 88 before filling said mold box 88 with concrete.

Figs. 11, 12 and 13 show an adaptation of the present invention to the manufacture of blocks smaller than the maximum size allowed by the cast box 129. Merely by substituting pertinent readily removable parts of the mold box assembly, and by filling the unused portion of the cast box 129 with a suitable spacer element, different size concrete blocks can be made. In Figs. 11, 12 and 13, the cast box 129 and pertinent portions of the table frame structure 84 are shown in phantom.

In the manner of construction and operation similar to that of the adaptation for the large-size blocks 50, the modified core bridge 128A is bolted to the pads 92 by the bolts 158A, the cores 127A extend through the core holes 165A of stripper 162A and are bolted to core bridge 128A, and the half cores 155A are aligned to the ends of the mold box 88 by the alignment pins 157A.

The space enclosed by the steel lining 131 is modified by the liner 131A which is secured to the spacer casting 130A by the plurality of bolts 132A. Spacer 130A is also bolted to the table framework 84. Figs. 12 and 13 show the modified stripper 162A with its downward extending sides 164A, top plate 163A, and slots 312A adapted for operation with a small-size block. Fig. 12 is shown shortly after the beginning of the work cycle when stripper 162A has been pushed slightly off the pegs 166A in the process of stripping the small-size concrete block from the mold box 88.

Section IV.—Pallet feed station 1

Figs. 16 through 22 show the general assembly and operation of the pallet feeding mechanism which is supported by the base 51 and extends over the mold box 88 at station 1. The heavy bracket 169 is bolted to the base 51 of the machine by the plurality of bolts 170. Adjustably mounted on top of the bracket 169 is the main casting 171 which supports the pallet feeding Casting 171 is roughly rectangular in plan, Fig. 3, and consists of a flat plate 172 for bolting to bracket 169 across the front, two webs 173 which support the approximately cylindrical side section 174, and a web 175 across the back and having the bracket 176 to support the hydraulic cylinder 177. The center space, directly over and carefully aligned with the mold box 88, is the pallet opening above which are piled the pallets 159 to be fed to the mold box 88 one at a time.

The vertical pallet guides 178 on the two sides, and the vertical pallet guides 179 at the back of the pallet opening keep the pile of pallets 159 in proper alignment with the mold box 88. The guides 178 on the two sides are adjustably mounted on the casting 171 by means of the clips 180. The two horizontal pallet guides 181 are adjustable along their slotted openings 182 to meet the forward edge of the bottom pallet 159 of the pile and are bolted to the casting 171 and plate 172 by the clamping bolts 183. Fig. 18 shows the guides 181 adjusted for narrow pallets 159A, with a large-size pallet 159 shown in phantom.

The pallet feeding mechanism consists of two symmetric halves which act concurrently at opposite sides of the mold box 88 to drop the pallets 159 one at a time as they are needed into the mold box 88. The piston rod 191 of the hydraulic cylinder 177 moves the gear rack 192 so as to operate the two rocking gears 193, each pivotally connected to the web 175 by one of the two pivots 194. Each rocking gear 193 engages its respective gear system, Fig. 19, which comprises a gear 195 rotatable with the shaft 196. The shaft 196 is journaled in the side section 174 to serve as the axle for the three similar gears 197, each of which in turn engages its respective gear rack 198 slidably mounted within the bearing encasement 199 of the structure 174. By the aforesaid linkage, downward movement of the piston rod 191 moves each gear rack 198 and the corresponding pad 201 and tongue or pallet chisel 202 of each gear rack 198 toward the pile of pallets 159.

Figs. 20, 21 and 22 show details of the operation of one of the pallet chisels 202. Each of the other five chisels 202 and their appurtenances have similar function and construction. As the pad 201 moves toward the pile of pallets 159, it releases the dogleg lever 205 which is pivotally mounted on the bearing 203 of the brace 204 of the structure 174. Threaded through the dogleg lever 205 is the adjusting nib 206 which supports the pile of pallets 159 in the feeding position. Movement of chisel 202 in the direction of the arrow 207 causes the chisel 202 to move into position between the bottom pallet and the second pallet upward therefrom. With the same motion, the pad 201 moves forward to release the upper arm of the dogleg lever 205 and allows it to rotate in the direction of the arrow 208 to permit the bottom pallet of the pile to slide off the nib 206 into the mold box 88.

If necessary, the mold box 88 may be vibrated at this time to facilitate the settling of the pallet in the bottom of the mold box 88.

Movement of the rack 198 in the opposite direction of arrow 207 (upward motion of gear rack 192) disengages the chisel 202 from the pile of pallets 159 and simultaneously rotates the dogleg lever 205 upward to support the pile of pallets 159 on the nib 206. As pallets 159 are fed from the bottom of the pile into the empty mold boxes 88 which are successively rotated to the pallet feeding position by action of the table 52, additional pallets 159 are placed on top of the pile by hand.

The chamfered ends 168 of the pallets 159 may be used to permit the chisel 202 to operate as above described to separate the pallets and permit the pallets 159 to drop into the mold box 88 from above. Vertical spacing and separation of the individual pallets in the pile in any desired manner may be employed in place of the chamfered ends 168 to facilitate the entry of the chisel 202 into the pile of pallets.

A series of safety switches are incorporated in the machine to prevent rotation of the table 52 and damage to the machine before all work operations have been successfully completed. Reference will be made to the switches as they are encountered in the discussion of the machine, but details of their wiring will be discussed later in connection with Fig. 45. Attached to the bracket 175 at the rear of the hydraulic cylinder 177 is the limit switch 209, Fig. 16, which is closed by the feeler 211 of piston rod 191 when piston rod 191 is at the top of its stroke or zero position. Downward movement of the piston rod 191 opens the switch 209 until the piston returns to its zero position. Rotation of table 52 is prevented until switch 209 is closed.

The pallet safety switch 212 and spring finger 213, which are attached to the web 175 near the open top of the mold box 88, provide the safeguard against filling the mold box 88 with cement before a pallet 159 is in position. As a pallet 159 falls into the mold box 88 at station 1, it brushes against the spring finger 213 to momentarily close the pallet switch 212. Otherwise the table will not rotate and index the mold box 88 at station 2.

*Section V.—Concrete filling station No. 2*

Supported on a structural steel framework from the base 51 and the helmet 83 and extending over the table 52 and mold box 88 at station No. 2 is the mechanism for feeding concrete to the mold box 88. Fig. 24 is a partial side elevation showing the assembled mechanism at station 2 in position at hte beginning of the work cycle. Fig. 25 is a vertical half section through the chute 224, knife 239, and knife carriage 235. Fig. 26 is a partial vertical section through the concrete feed mechanism and center line of the mold box 88 showing the cutoff knife 239 at the end of its travel with the chute 224 open to feed concrete to the mold box 88.

Two vertical structural members 214 are bolted to the base 51 by the plurality of bolts 215. Each end of the beam 216 is bolted at the top of one of the vertical members 214 by the plurality of bolts 217. The outer ends of the two horizontal beams 218 are bolted to the top beam 216 by the plurality of bolts 219. The inner end of each of the two beams 218 are bolted to the casting 221 by the plurality of bolts 223. Casting 221 is secured to a pad on the helmet 83 by the plurality of bolts 222, Fig. 26.

Chute 224 is adjustably supported on its four sides by a plurality of wood blocks which tend to prevent transmission of vibration from the chute 224 to its supporting structure and which allows the chute 224 to be carefully aligned over the mold box opening at station 2. The two wood blocks 225 bear on two opposing sides of the chute 224, Figs. 24 and 26, and are secured by a plurality of bolts 227 to a pair of angle clips 226, one to each block 225. The angle clips 226 are in turn secured to the beams 218. On each of the remaining two sides of chute 224 is an angle bracket 100, Fig. 25, secured to chute 224 by the plurality of bolts 101, and secured to the wooden blocks 102 and to beam 218 by the plurality of bolts 103.

The casting 228 is connected between the two members 218 at their outer ends by the plurality of bolts 229. The pair of rails 233 are held in parallel alignment with the casting 228 disposed between one pair of ends of the rails 233 and the casting 221 disposed between the other pair of ends of the rails 233. The rails 233 are bolted to pads on opposing ends of the casting 228 by the plurality of bolts 231, and are bolted to similar pads on opposing ends of the casting 221 by the plurality of bolts 232. Oversized bolt holes, not shown, for the bolts 231 and 232 permit minor adjustments of the height of the rails 233 by adjustment of the vertical bolts 230 at each end of said rails 233. Thus the exact proper clearance of the knife 239 above the mold box 88 can be assured.

Figs. 25 and 26 show only one side of the knife carriage equipment because of the symmetry of operation and construction of the other portions not shown. The knife carriage 235 is suspended from four brackets 236, two brackets 236 on a side, and each bracket supporting a wheel 234 rotatably mounted on an axle 237 so as to ride on one of the tracks 233. Attached by the bolts 238 to the bottom of the carriage 235 is the steel cutoff knife 239 which has a rectangular opening 241 the size of the opening in the mold box 88. In the closed position, knife 239 completely closes the bottom of chute 224. In the open position, Fig. 26, opening 241 aligns with the bottom of the chute 224 and the top opening of the mold box 88 to allow concrete mix from chute 224 to completely fill the mold box 88. In Fig. 26, the clearance between knife 239 and the wear plates 133 around the top of the mold box 88 has been exaggerated for clearness. In practice the fit is sufficiently close to prevent cement from leaking around the knife 239 at the base of chute 224.

Secured by the bolts 245 to the base of the chute 224 at its side farthest from the center of the table 52 is the wear plate 243 which has its bottom edge turned out at an angle and welded to wear plate 244. Wear plate 244 extends outwardly from the chute 224 to more than cover the opening 241 in knife 239 when said knife 239 is in the closed position. The plates 243 and 244 are adjustably mounted to the chute 224 by the plurality of bolts 245 so that plate 244 bears on the top surface of the knife 239 and prevents concrete from boiling out when the knife 239 is partially in the open position. The wear plate 246 is adjustably mounted to ride on top of the knife 239 at the base of the chute 224 on the remaining three sides thereof and is secured to said chute 224 by the plurality of bolts 242.

Referring especially to Figs. 24 and 26, displaced between and bolted to the two vertical supports 214 by the plurality of bolts 260 is the casting 262 having the bracket 253 which supports the adjustable casting 252 which in turn supports the adjustable wear plates 248 and 249. Casting 262 also supports the bearings 261 for the lever arm system 259 which actuates the cut-off knife 239. Brackets 269, bolted to the casting 262 by the plurality of bolts 270, support table 52 at station 2 by means of the heavy adjustable bolt legs 99 threaded into the bottom sides of the pads 91. (See also Fig. 8.)

The wear plate 248 is secured to wear plate 249 by the plurality of screws 251 and extends over the table top plate 86 to leave only a small clearance between the plate 133, which latter forms the collar around the top of the mold box 88. The adjoining upper surfaces of the plate 249 and the plate 248 are flush and are adjusted to bear on the under surface of knife 239 by raising or lowering the casting 252 from the bracket 253 by means of the plurality of adjusting screws 254. The clearance between the plate 248 and the knife 239 is enlarged in the drawing for clearness. Plate 249 is adjusted relative to bracket 253 by the plurality of bolts 247 which may be loosened to allow in or out adjustment of plate 249 by means of the adjusting screws 250.

Hydraulic cylinder 255 is mounted on base 51 by means of the bracket 256 and plurality of bolts 257, Fig. 24, and furnishes the power to move the knife carriage 235. The piston rod 258 is operatively connected to the lever system 259 which is pivoted at bearing 261 to actuate the adjustable connecting rod 263, which latter is connected to the knife casting 235 by means of the bearing 264. Thus when piston rod 258 is extended, knife 239 is in the open position.

Attached to the chute 224 by the bolts 265 is the electric vibrator 266 which vibrates the chute 224 to densify the concrete therein and to facilitate the flow of even a relatively dry mix into mold box 88 when the knife 239 opens. Vibrator 266, similar in construction and operation to the vibrators 98 previously described, Fig. 9, is controlled manually by a switch which is generally left on when the machine is operating and which is located on the panel board 55 near station 1.

A limit switch 267 is attached to the rail 233 in such a manner that the finger 268 projecting downward from shaft 237 will close switch 267 when knife 239 reaches the closed position. With switch 267 open, table 52 is prevented from rotating while knife 239 is in position to allow concrete to pour from chute 224.

*Section VI.—Compression station No. 3*

Referring to Fig. 27, extending upward from the base 51 are two pedestals 273 which support the helmet 83 and which are held firmly in place by the heavy bolts 274. The helmet 83 extends over the center of the table 52 and carries the top end of shaft 82, Fig. 3. Above and below the mold box 88 at station 3 is the mechanism for compressing the concrete in the mold box 88. A bucking-up plate 271 is held rigidly over the top of the mold box 88 by the heavy bracket or helmet 83. An hydraulic cylinder 272 attached beneath the mold box 88 to the base 51 pushes upward on the stripper 162 to compress the concrete between the stripper 162 and the bucking-up plate 271.

Fig. 28 shows the bucking-up plate assembly in detail. A flat rectangular pad 275 is machined on the underside of the helmet 83 and attached to the plate 276 by the plurality of bolts 277. The underside of plate 276 is fastened by the plurality of bolts 278 to the removable plate 271 which is adjusted so that its bottom surface bears against the top surface of the mold box 88 (shown dotted) when in position at station 3. The adjustment is accomplished by means of the wedge system 281, shown in section, Fig. 28, which fills the space between plate 276 and pad 275. Upon loosening bolts 277, wedges 281 may be moved by means of the plurality of adjusting screws 282 to force the plate 276 downward or release it for movement upward. Through the wedge system 281 bearing against the surfaces of plate 276 and pad 275, the thrust of the block 50 being compressed is distributed to the helmet 83. Two vertical plates 283 cover the sides of the wedge assembly 281 and are fastened to the pad 275 by the plurality of bolts 284.

To the top of the piston rod 285 is fastened the plate 286 which engages the bottom ends of the stripper 162 when actuated by the piston rod 285 and produces strong pressure on the stripper 162 to compress the concrete between the stripper 162 and the bucking-up plate 271.

A limit switch 287 attached to the table gear cover 73 is closed by the plate 286 only when the piston rod 285 returns to its lowest position before the beginning of the work cycle. Table 52 is unable to rotate while switch 287 is open.

Section VII.—Stripping mechanism of station 4

Attached to the base 51 of the machine at station 4 is the mechanism for expelling the block 50 from the mold box 88 and for conveying block 50 from the table 52. Reference is made especially to Figs. 29, 30, 31 and 32 which show station 4 half way through the work cycle.

The hydraulic cylinder 288 is attached to the base of the machine 51 directly under the center of the mold box 88 at station 4. Attached to the top of the piston rod 289 by the nut 291 is the plate 292. When the piston rod 289 is actuated, plate 292 bears against the bottom surfaces of stripper 162 to force stripper 162 upward until pallet 159 and a molded but uncured block 50 are above the mold box 88, Fig. 29.

Also attached to the base 51 of the machine at station 4 is a heavy bracket 293 which extends outwardly from the table 52 and has bolted to its top surface a framework 294. Framework 294 carries the hydraulic cylinder 295, the bearings 296 for the two sprocket wheels 297, the two gears 298 and two ratchet clutches 299 for driving the sprockets 297 one way only, the two roller chains 300, the two chain supports 301, the two stationary block retainers 302, and the two tracks 303 for the carriage 304. The roller chains 300 are adapted to carry the finished blocks 50 toward the periphery of the machine. The weight of the concrete blocks on chain 300 is supported by the chain supports 301 which latter comprise two narrow parallel beams having the top edges thereof directly under the upper loop of the two roller chains 300. The chain supports 301 are secured to and supported from the frame 294 by the brackets 317.

Tension in the chains 300 is adjusted by means of the adjusting screws 290 which move the slidable racks 279 upon loosening the bolts 280 which secure the slidable rack 279 rigidly to frame 294. The ends of the chains 300 located farthest from the center of the table 52, and the corresponding bearing structures 296 for the sprockets 297, are supported by the slidable rack 279. Thus outward movement of the racks 279 tightens the chains 300. Tableward movement of racks 279 loosens the chain 300.

The carriage 304 is connected to the end of the piston rod 305 by the pin and bearing assembly 306 and moves in or out radially with respect to the table 52 when actuated by the hydraulic cylinder 295, Fig. 29. The carriage 304 rides on the eight wheels 307 which are journaled to the carriage 304 in pairs, two pairs on each side, one wheel of each pair bearing on the upper surface and the other bearing on the under surface of its respective track 303. Lateral alignment of carriage 304 on the tracks 303 is maintained by a roller 308 journaled in carriage 304 between each pair of wheels 307 and bearing against the side of the adjacent track 303, Fig. 32. Also attached to the carriage 304 and movable therewith are the two pickoff arms 309 and the gear racks 311. Vertical adjustment of the carriage 304 and its pickoff arms 309 is maintained by vertical adjustment of the tracks 303 by properly setting the vertical track adjusting screws 310 after loosening the bolts, not shown, which secure track 303 to frame 294. Vertical adjustment of the gear rack 311 may be made by loosening the bolts 324, which secure the rack 311 to the carriage 304, and by turning the adjusting screws 323, Fig. 29.

When the stripper 162 reaches its top position, cylinder 295 operates to move the carriage 304 toward the center of the table 52 such that one of each of the pickoff arms 309 enters one of the milled slots 312 in the top of the stripper 162 and below the pallet 159 which carries the block 50. Fig. 36 shows a sketch of the stripper 162 with one of the pickoff arms 309 about to enter slot 312. As carriage 304 moves toward the center of the table 52, the gear racks 311 rotate the gears 298, but the sprocket wheels 297 are held stationary by the ratchet action of the clutches 299. Thus chain 300 does not more.

Attached to the tableward end of each pickoff arm 309 is a spring hook 313. Similarly attached near the middle of the outer side of each of the two arms 309 is a spring hook 314. A third pair of spring hooks 315 are attached at the tableward ends of the stationary block retainers 302, one to each retainer 302. The three sets of hooks 313, 314 and 315 act similarly in that during movement of said hooks 313, 314, and 315 tableward with respect to the pallet 159, or during movement of the pallet 159 outward, the hooks 313, 314, and 315 spring down and glide under the pallet 159. During movement of the hooks 313, 314 and 315 away from the table 52, or movement of the pallet 159 tableward, the hooks 313, 314 and 315 engage and pull the pallet 159 away from the table 52 or prevent tableward movement thereof.

As the carriage 304 reaches the end of its tableward travel, the hooks 313 at the ends of the pickoff arms 309 are forced up by the springs 316 to engage the tableward edge of the pallet 159. Cylinder 288 now starts to retract. The block 50 and pallet 159 rest on the arms 309 and are held from sliding off by the hooks 313. Likewise hydraulic cylinder 295 starts its return stroke to move carriage 304 with the pickoff arms 313 and 314, pallet 159, and block 50 radially away from the table 52. At the end of the stroke of cylinder 295 radially outward from table 52, pallet 159 and block 50 rest on the stationary block retainers 302. On the next cycle of operation of cylinder 295, return movement of the block 50 and pallet 159 on the arms 309 is prevented by the spring hooks 315 attached to the tableward ends of the stationary block retainers 302.

Concurrently with the outward stroke of cylinder 295, the gear racks 311 rotate the gears 298 which now engage the sprockets 297 through the ratchet clutches 299. The roller chains 300 are thus rotated so that the top strands thereof move radially outward from the table 52. When the arms 309 return toward the stripper 162 to engage the subsequent pallet and block at the next cycle of the machine, the spring hooks 314 engage the first pallet 159 on the stationary block retainer 302. On the outward movement of the carriage 304, hooks 314 pull pallet 159 with its block 50 off block retainers 302 and onto the moving chains 300.

The sequence of the different steps in the travel of the block 50 is shown diagrammatically in Figs. 33, 34, and 35. Blocks 50, 50', and 50'' are shown in phantom. It is assumed that the machine has been running and that three blocks have been made. Fig. 33 is at the beginning of the work cycle after block 50' has been moved to the stationary block retainers 302 by the hooks 313, and after block 50'' has been moved to the chains 300 by the hooks 314. Block 50 is in the mold box 88 in the table 52. The carriage 304, not shown, is at its outward position. After cylinder 288 raises block 50 out of the mold 88, carriage 304 moves inward until the arms 309 pass under the pallet 159 of block 50.

Fig. 34 is a moment later than Fig. 33. Carriage 304 has moved to the end of its inward travel. Block 50'' has remained unmoved on the chains 300. Block 50' has been held stationary on the block retainers 302 by means of the hooks 315. Block 50 is on the arms 309 with hooks 313 engaging the inward edge of the pallet 159 of block 50. Hooks 314 on the sides of the arms 309 have passed under block 50' to engage the inward edge of the pallet 159' below block 50'.

Fig. 35 is a moment later than Fig. 34. The carriage 304 has partially completed its outward run. Block 50'' has moved outward with the chains 300 on which it rests. Block 50' has moved outward due to the action of the hooks 314 and is now partly on the chains 300. Block 50, held by the hooks 313, has moved outward with the arms 309 and is partly over the stationary block retainers 302. Hooks 315 on the retainers 302 are depressed by the pallet 159 so that the block 50 may easily slide onto said retainers 302.

Completion of the outward movement of carriage 304 will again place all parts in the position shown by Fig. 33, except that block 50'' will have moved outward on the chains 300, block 50' will be in the position shown as block 50'', block 50 will be in the position shown as 50', and the mold box 88 will be empty. This marks the end of the work cycle. The table 52 is ready to rotate and bring a new block in position at station 4 for stripping.

Pusher plate 292 has an extension 318 to which is attached a spring finger 319. At the top of the stroke of the piston rod 289, spring finger 319 closes switch 321 attached to the bracket 293. The closing of switch 321 actuates hydraulic cylinder 295. On the return of the piston rod 289, the spring finger 319 closes the limit switch 322 also attached to the bracket 293. When switch 322 is open, table 52 is prevented from rotating.

Limit switches 325 and 326 are attached to the track 303 in a manner to be closed by the carriage 304 at the tableward end and outward end of its travel respectively. With switch 326 closed, hydraulic cylinders 177, 255, 272, and 288 can be actuated to extend at the proper time. Closing of switch 325 causes hydraulic cylinder 295 to extend and return carriage 304 to the outward end of its travel.

*Section VIII.—Timing controls*

Attached to the top of the hub of the bull gear 61 are the timer cams shown generally as 77 in Fig. 4. Figs 37 and 38 show details of the assembly 77 at the moment the pin 63 on the bull gear 61 enters the slot 64 on the Geneva cam 65 at the end of the work cycle.

A sleeve liner 327 is in the bearing between the hub of the bull gear 61 and the gear case cover 73. A plate 328 is attached to the top of the hub of the bull gear 61 by bolts 329. Attached to plate 328 by a plurality of pins 331 is a short vertical shaft 332. Mounted one below another on shaft 332 are the three cams 333, 334 and 335 which are separated from each other by the two spacer rings 336, all of which are securely fastened to shaft 332 by means of the washer and bolt combination 337 and by keys 338 and 339. The keys 338 and 339 are of different sizes so that cam assembly 77 cannot be assembled improperly. The cam assembly 77 rotates with the bull gear 61 in the direction indicated by arrow 341. A removable cover 342 protects the assembly 77.

Three cam switches 343, 344 and 345 are secured to the brackets 320, 330 and 340 respectively, which in turn are adjustably secured to the table drive cover 73 by the plurality of bolts 350. Minor adjustment in the timing is made by loosening the bolts 350 and adjusting the brackets 320, 330, and 340 along the elongated bolt holes 360. The passage 346 in the casting 73, covered at its outer end by the fitting 347, is provided for the electrical leads to said three cam switches 343, 344, and 345. Each of said switches 343, 344, and 345 respectively has a feeler mounted at the proper height so as to bear against the respective cam 333, 335, or 334. Pressure on the feeler of each switch by the extended surface of its respective cam opens the switch. The switches are held closed by spring action. In Figs. 37 and 38, switches 343 and 344 are open and switch 345 is closed.

In Fig. 39 the three limit switches 343, 344, and 345 and their three cams 333, 335, and 334 respectively are shown diagrammatically to clarify the sequence of operation. The three cams are shown at the beginning of the work cycle which is a 90° rotation of the cams from the position shown in Figs. 37 and 38. From Fig. 39, it is noted that switch 343 closes at the beginning of the work cycle and remains closed through about two-thirds of the work cycle or for 180° of revolution of the bull gear 61. Switch 344 closes during the indexing cycle nearly 45° of revolution of the bull gear 61 before the beginning of the work cycle and remains closed until just before the pin 63 enters the Geneva cam 65, which is just before the end of the work cycle. Switch 345 closes before the beginning of the work cycle just before 343 closes and remains closed until just after switch 344 closes, which is about 28° of revolution of the bull gear 61 before the start of the work cycle. These three cams and their limit switches control the sequence of all other parts of the machine by means of their interconnection with the other electrical and hydraulic controls to be explained later in reference to Figs. 44 and 45.

Figs. 40, 41 and 42 show details of the distributor ring assembly 81 which is attached to the hub 69 of the table 52, Fig. 4. Fitting tightly around the hub 69 is a split ring 348 held together by bolts 349 and prevented from turning on the hub 69 by studs 351 which extend into the hub 69. Securely fastened to ring 348 is a circular steel plate 352. Fastened to the underside of the plate 352 is a similar plate 353 of insulating material. Plates 352 and 353 may be in two halves as shown in Fig. 41 to facilitate assembling to ring 348. To the underside of the insulating plate 353 are fastened the two brass commutator rings 354 and 355. The inner ring 354 is also in two essentially equal segments to facilitate installation and forms the common electrical connection to the four vibrators 98 of the four mold boxes 88, each vibrator 98 being engaged with one mold box 88 as described above. The outer ring 355 is in four essentially equal segments which are insulated from each other by small air gaps and forms the selective electrical connections to the vibrators 98. Attached to the rings 354 and 355 respectively are the electrical binding posts 356 and 357 which lead up through the two plates 352 and 353, being insulated from the plate 352. The four binding posts 356 are attached to ring 354 at spacings 90° apart. Similarly secured to ring 355 are the four binding posts 357, each post 357 being paired with a post 356 and being spaced 90° apart so that one post 357 is secured to one of each of the four segments of ring 355. Each pair of binding posts 356 and 357 is electrically connected to its respective vibrator coil 148 by a pair of lead wires 358 (dashed lines, Fig. 40).

Electric current is supplied to each vibrator 98 through a pair of standard carbon brushes 76A and 76B, there being four pairs in all, one pair being attached by the clips 359 at one of each of the four stations to the top surface of one of each of the four brackets 75. The brushes 76A and 76B bear on the under side of the commutator rings 354 and 355 respectively and have adjusting screws and connections for the electrical leads (not shown) to an outside power source.

It has been found preferably not to vibrate the mold box 88 at station 4. Hence the brushes 76A and 76B at station 4 are not electrically connected to the power source, as shown by the open switch 361 in the schematic Fig. 43.

*Section IX.—Hydraulic system*

The operation and function of the hydraulic system which controls the various hydraulic cylinders or rams mentioned earlier in this specification are explained in reference to the schematic diagram, Fig. 44. Shown across the top of the drawing is the cylinder 177 which operates the pallet feed mechanism at station 1, the cylinder 255 which operates the cutoff knife mechanism at the concrete feeding station 2, the cylinder 272 which compresses the concrete in the mold box 88 at station 3, the cylinder 288 which expels the block 50 from the mold box 88 at station 4, and the cylinder 295 which actuates the concrete block pickoff mechanism to carry the block away from station 4 toward the periphery of the table 52. The corresponding electrical switches and pertinent identifying mechanical elements are also shown in schematic relationship with each other.

Each of the five control valves numbered 401 to 405 from left to right are standard four-way valves which operate respectively the five cylinders 177, 255, 272, 288 and 295. Valves 401 and 402 are electric solenoid operated. Valves 403, 404, and 405 are under electric solenoid control but are operated by hydraulic pressure supplied by the pilot line 407, shown as a dashed line leading from hydraulic line 431. The solid lines represent the feed lines for the hydraulic fluid. The normal operational direction of flow is indicated by the arrows. All valves and hydraulic cylinders of Fig. 44 are shown in the rest position before the respective solenoids are energized.

After motors 413 and 416 are started, pump 417 delivers hydraulic fluid from storage tank 418 to develop pressure at valve 402 through line 431 and at one end of cylinder 255 through line 423 so as to contract cylinder 255. Note that in the position of valve 402 shown by Fig. 44, the pressure outlet from line 431 is plugged. Line 422 from other end of cylinder 255 is connected through valve 402 and drain line 440 to storage tank 418. When solenoid on 402 is energized, valve 402 rotates 90° to connect pressure from line 431 to line 422 so as to extend cylinder 255. The plugged opening of valve 402 is then connected to the drain line 440.

With valve 402 rotated 90° from the position shown in Fig. 44, cylinder 255 will have pressure on both sides of its piston, but due to the smaller effective area on the piston rod side, the cylinder 255 will be extended and the cutoff knife 239 will be moved to the open position which allows concrete to pour from chute 224 into the mold box 88. Cylinder 255 will remain extended until the solenoid for 402 is de-energized.

Pump 414 delivers fluid pressure from the tank 418 through line 439, the one way check valve 409, and lines 437 and 434 to valve 405. In the position of valve 405, Fig. 44, pressure is delivered to cylinder 295 through line 428 to hold the piston of cylinder 295 in the extended position; and the right hand outlet from cylinder 295 is connected through line 429 and valve 405 to the drain line 440. When the solenoid for valve 405 is energized, the pilot pressure rotates valve 405 90° so that line 428 is connected to drain line 440; and line 429 is connected to pressure line 434 to contract cylinder 295 and move the pickoff arms 309 under the block 50 at station 4.

Pump 414 also delivers pressure through lines 437 and 433 to valve 404. In the position of valve 404 shown in Fig. 44, pressure is delivered to the top of the cylinder 288 through line 427 to hold the piston of cylinder 288 down; and line 426 connects the lower end of cylinder 288 to the drain line 440. When the solenoid of valve 404 is energized, the pilot pressure of pilot line 407 rotates valve 404 to connect line 427 to the drain line 440 and to connect line 426 to the pressure of line 433. Thus the piston of cylinder 288 is forced upward and the block 50 is expelled from the mold box 88 at station 4. Line 437 is also connected to the standard four-way pressure operated valve 412 which is operated from the pilot line 419, shown dashed, connected to line 437.

Pump 415 pumps fluid from tank 418 to deliver pressure through line 438 to the hydraulic sequence valve 411 which is adapted to deliver pressure first through lines 432 and 436. When pressure in lines 432 and 436 reaches a predetermined amount, valve 411 then supplies pressure to line 435 as well as to lines 432 and 436. When pressure in valve 411 reaches a predetermined excessive value, the pilot line 408, shown as dashed line between valve 411 and pump 415, operates a pressure release valve on pump 415. Thus valve 411 acts as a safety valve as well as a sequence valve.

Line 436 delivers pressure to valve 412 which is connected to deliver pressure through the one way check valve 410 until such a time as pressure in line 437 reaches a predetermined value. Then the pilot pressure of line 419 changes valve 412 to connect the pressure of line 436 to the plugged outlet of valve 412 and to connect valve 410 to the drain line 440.

Line 432 delivers pressure to valve 403 which in the position shown, Fig. 44, delivers pressure through line 425 to contract cylinder 272. Line 424 connects the lower end of cylinder 272 to the drain line 440. In the line 425 is the pressure relief valve 406 which acts as a safety valve and "blows" to tank 418 through the drain line 440 when pressure on line 425 exceeds a predetermined limit. When the solenoid on valve 403 is energized, the pilot pressure changes valve 403 to connect pressure from line 432 through line 424 to the bottom of the cylinder 272 so as to compress the block 50 at station 3. The same valve change connects the top side of the piston of cylinder 272 to the drain tank 418. Note that pilot line 407 will not operate valves 403, 404, and 405 until pressure is on line 431, and that the combination of valves 409, 410, 411, and 412 does not deliver pressure to cylinder 177 until after cylinders 272, 288, and 295, are subjected to a predetermined pressure. Thus the pallet feed mechanism at station 1 will not operate until the remainder of the hydraulic system is under normal operating pressure.

When pressure has built up in line 432 to a predetermined pressure, valve 411 delivers pressure through line 435, 430, and 421 to cylinder 177. An adjustable metering valve 407 is in this circuit for controlling the rate of hydraulic fluid flow to cylinder 177.

Pressure in line 421 goes to the lower connection of cylinder 177 so as to extend cylinder 177. In the position of valve 401 shown in Fig. 44, pressure of line 430 is connected to the plugged opening of valve 401 and line 420 is connected to drain 418 from the top connection of cylinder 177. When the solenoid of valve 401 is energized, valve 401 changes so that pressure in line 430 is connected through line 420 to top of cylinder 177. Thus the pallet feed mechanism is actuated. It will be noted that pressure is also still connected through line 421 to the bottom of the cylinder 177, but due to difference in effective area of the two sides of the piston of cylinder 177, pressure in line 420 will force cylinder 177 down.

In line 420 is a pressure switch 400. Excessive pressure in line 420, which might by caused by jamming of the pallet chisel 202 for example, will break electrical connections in the switch 400 and stop the table drive motor 57.

*Section X.—Electrical circuit and sequence of operation*

Fig. 43 shows a schematic top view of the equipment for the block machine, with a general indication of the wiring superimposed on a phantom outline of the machine. At the top of Fig. 43 is shown the hydraulic motor and pump assembly 56, including the hydraulic pump motors 413 and 416, and the electrical control panel 54. At the bottom of Fig. 43 is the switch panel 55. Also shown in their approximate positions are the table drive motor 57, the distributor ring assembly 81, the timing cam assembly 77, the four mold box vibrators 98, the chute vibrator 266, and the various limit switches. Fig. 43 does not attempt to follow the electrical wiring through the conduit 346.

Details of the electrical circuits and the timing of events in the operation of the machine are discussed in relation to the schematic electrical diagram, Fig. 45.

440 volt, 60 cycle, 3 phase electrical power is supplied to the machine through the main switch 500 to the leads 501, 502, and 503. The particular type of electrical power is not controlling, and slight modifications will adapt the electrical circuits shown for other suitable electric power sources.

From switch 500, the power goes to the three motors in parallel, namely, the two hydraulic pump motors 413 and 416 and the table drive motor 57.

A single phase power tap between leads 502 and 503 and in parallel with the three said motors energizes the parallel circuits through the primary coil of the voltage step-down transformer 504; the mold box vibrators 98 at stations 1, 2, and 3, and the solenoids for the hydraulic valves 401, 402, 403, and 404; the solenoid for the hydraulic valve 405; and the chute vibrator 266.

The secondary coil of transformer 504 is in series with the emergency stop circuit comprising the emergency stop switch 505 and the three pairs of normally closed switches 506. A pair of switches 506 are mechanically operated by a pair of bimetallic overload circuit breakers 507 in the circuit for each of the three motors 57, 413, and 416. An overload in either lead 501 or 502 to any one of the three said motors heats the corresponding bimetallic circuit breaker 507 and opens the corresponding adjacent normally closed switch 506. The three fuses 508, one in each lead 501, 502, 503, further protect against power overloads.

The various secondary circuits, which control the motors 57, 413, 416, and various other electrical and hydraulic circuits are powered from the secondary coil of transformer 504. It is noted from Fig. 45 that closing of switch 500 does not start motors 57, 413, and 416 until the respective coils 518, 512, and 514 are energized. The energizing of coil 512 closes the three normally open relay switches 513, one in each lead to motor 413, and closes the normally open relay switch 516 in the bypass circuit of the two hydraulic motor starting switches 517. The energizing of coil 514 closes the three normally open relay switches 515, one in each lead to motor 416. The energizing of coil 518 closes the three normally open relay switches 519, one in each lead to motor 57.

The hydraulic starting circuit can be closed by closing either of the hydraulic start switches 517. Coils 512 and 514 then become energized and close the normally open switches 513 and 515 which in turn start the hydraulic pump motors 413 and 416 respectively. Also the normally open bypass switch 516 is caused to close so that the hydraulic motor circuit will remain closed after the hydraulic start switch 517 is allowed to open. The hydraulic motor circuit is broken by operation of either one of the two stop switches 522. The double hydraulic start and stop switches allows the hydraulic pump system to be started or stopped at either the machine or at the pump house 56.

Conditions under which the table motor 57 is started are somewhat more complicated. First table start switch 523 is closed, energizing coil 524. Thus the normally open bypass relay switch 526 is closed, and also the normally open relay switch 527 is closed. With switch 527 closed, it is still necessary to close the normally open switch 528 before the motor start coil 518 is energized.

Switch 344, operated from cam 335, is closed during the latter part of the indexing cycle and stays closed until nearly the end of the work cycle or until just before the bull gear pin 63 enters the Geneva slot 64. While switch 344 is closed, coil 529 is energized and switch 528 will be closed.

With both switches 527 and 528 closed, the circuit through the motor starting coil 518 is completed and the normally open relay switches 519 are caused to close, thus starting motor 57.

Switch 344 is timed to open just before the bull gear pin 63 enters the slot 64 of the Geneva cam, which is just before the end of the work cycle. At this time the pallet feed mechanism has completed its operation of dropping a pallet into the mold box 88 at station 1, hydraulic cylinder 177 has returned to the top of its stroke to close switch 209; the concrete feed mechanism has completed its operation of filling the mold box 88 with concrete at station 2, and the knife carriage 235 has returned to the closed position to shut off further concrete from the hopper 224 and to close the switch 267; the concrete compression operation at station 3 has been completed, and hydraulic cylinder 272 has returned to the bottom of its stroke to close switch 287; and the completed block at station 4 has been pushed from the mold box 88 by hydraulic cylinder 288, and cylinder 288 has returned to the bottom of its stroke to close switch 322. The above events are occurring at the various stations more or less simultaneously during the work cycle with the result that switches 209, 267, 287, and 322 are all closed at the end of the work cycle. Also during the work cycle when a pallet falls into the mold box 88 at station 1, pallet switch 212 momentarily closes and energizes coil 531 which closes the normally open bypass relay switch 533 so as to bypass switch 212 when cam switch 345 is closed. Switch 345, operated from cam 334, is timed to close just before the beginning of the work cycle and to remain closed throughout the work cycle and until after switch 344 closes during the latter part of the indexing period. Thus during the work cycle with switch 345 closed, a momentary energizing of coil 531 by the momentary closing of switch 212 will cause switch 533 to remain closed. Coil 531 will be continuously energized to hold switch 534 closed until the end of the work cycle, at which time switches 209, 267, 287, and 322 are also closed.

Coil 529 will thus be energized to close switch 528 even when cam switch 344 opens at the end of the work cycle, and the circuit through motor 57 is maintained closed. During the latter part of the indexing cycle, cam switch 344 closes and bypasses relay switch 534. Then cam switch 345 opens, breaking the circuit through coil 531 and allowing the normally open switches 533 and 534 to reopen. The pallet switch 212 is thereby reset for operation during the next work cycle.

It is to be noted that either switch 344 is closed (during the work cycle) or else the series of switches 209, 267, 287, and 322 are closed (during the indexing cycle). If however some part of the work cycle does not properly function and the mechanisms at all stations do not return to their proper positions so as to allow the table 52 to rotate safely, one of the switches 209, 267, 287, or 322 will be open at the start of the indexing period. The circuit through motor start coil 518 will then be broken and the table drive motor 57 will stop. If the series of switches 209, 267, 287, 322 are closed but switch 344 is open at the time the main switch 500 is opened for any reason, coil 531 will be de-energized and the hold over switch 533 will open. Then the table motor 57 cannot be started merely by closing master switch 500 and the table start switch 523. The jog switch 535 is provided to jog the table 52 around until switch 344 closes during the latter part of the indexing period. Then motor 57 may be started by closing the table start switch 523. It is to be noted that the circuit through coil 524 can never be closed while the jog switch 535 is closed because the lower portion of the jog switch 535 opens the circuit through coil 524. Thus the normally open switches 526 and 527 cannot be closed while jog switch 535 is closed. When jog switch 535 is released or opened, the table drive motor 57 will stop. It will then be necessary to start motor 57 by closing the table start switch 523.

Table motor 57 is stopped by opening table stop switch 536. Coil 524 becomes de-energized and switch 527 in the motor start circuit through coil 518 opens.

Assuming that the hydraulic pump motors 413 and 416 and table drive motor 57 have been started, cam switch 343 closes at the beginning of the work cycle and remains closed until the work operations are completed. At the beginning of the work cycle, pickoff cylinder 295 is at its extended position so that switch 326 is closed. Thus coil 537 is energized to close the normally open bypass relay switch 538 and to close the normally open relay switch 539 in the circuit that actuates the three vibrators 98 at stations 1, 2, 3 and the solenoids for the hydraulic valves 401 through 404.

With the hydraulic pumps 414, 415, and 417 already in operation, pressure in the hydraulic line 435 from sequence valve 411 operates the pallet feed hydraulic cylinder 177 when the solenoid for valve 401 is energized. The pallet feed mechanism drops a pallet into the mold box at station 1, thereby closing pallet switch 212 which causes the closing of switches 533 and 534 as previously discussed. The energizing of the solenoid for valve 402 actuates the concrete feed hydraulic cylinder 255 which moves the cutoff knife 239 to its open position so as to allow the mold box 88 at station 2 to fill with concrete. The energizing of the solenoid for valve 403 actuates the compression hydraulic cylinder 272 to compress the concrete in the mold box at station 3. The energizing of the solenoid for valve 404 causes hydraulic cylinder 288 to push a molded concrete block from the mold box 88 at station 4. When cylinder 288 is at the top of its stroke, the limit switch 321 is closed. Meanwhile the vibrators of station 1, 2, and 3 may be actuated to vibrate the mold box, if desired, to settle the pallet in the bottom of the mold box at station 1. The vibration at stations 2 and 3 causes the concrete to settle in the mold boxes at stations 2 and 3 and to be subjected to vibratory motion while being charged in the mold boxes and while being compressed therein.

The closing of switch 321 also energizes coil 541 which closes the two normally open relay switches 542 and 543. Switch 542 closes the bypass circuit for switch 343, and switch 543 closes the circuit through the solenoid for valve 405, which latter operates the hydraulic cylinder 295 for the concrete block pickoff mechanism at station 4. The energizing of the solenoid for valve 405 causes hydraulic cylinder 295 to contract, thereby opening switch 326 and closing switch 325. Opening of switch 326 at this time has no effect upon the circuit because it is bypassed through switch 538. Closing of switch 325 energizes coil 544 which closes the normally open bypass relay switch 545 for switch 325 and opens the two normally closed relay switches 546 and 547. The opening of switch 547 breaks the bypass circuit for switch 343. The opening of switch 546 breaks the circuit through coil 541 which then allows switches 542 and 543 to open. The opening of switch 543 de-energizes the solenoid for valve 405 and causes hydraulic cylinder 295 to again become extended, which movement pulls a completed block from the mold box 88 at station 4 by means of the spring hooks 313. Also the extension of cylinder 295 opens switch 325 and closes switch 326 and completes the cycle of the pickoff mechanism.

At approximately the time cylinder 295 begins to extend, cam switch 343 opens. Coil 537 is then de-energized and switches 538 and 539 reopen. The opening of switch 539 stops the vibrators 98 at stations 1, 2 and 3 and de-energizes the solenoids for the hydraulic valves 401, 402, 403 and 404. The latter action causes the cylinders 177, 255, 272 and 288 to return to their positions at the beginning of the work cycle, thus opening switch 321 and closing the safety limit switches 209, 267, 287, and 322. The opening of switch 321 de-energizes coil 544 which then permits switch 545 to open and switches 546 and 547 to close, thus completing the work cycle of the machine. By this time the bull gear pin 63 is about to enter the Geneva slot 64. Cam switch 344 opens, and the machine is ready to index to the next position.

It is to be noted that the concrete chute vibrator 266 is operated from switch 548 and may be turned on independently of the action of the other control circuits.

As indicated in the discussion of Fig. 44, pressure switch 400 is in series with the motor start coil 518. If for any reason the pallet chisel jams during the pallet feed operation at station 1, as may happen if lumps of hardened concrete are stuck to the pallets, hydraulic pressure will build up in line 420 and operate to open the pressure switch 400, stopping motor 57.

By the above disclosures and specifications, the complete operation and construction of a new and improved machine for the automatic manufacture of molded building blocks has been described.

The machine disclosed herein embodies my novel process for the manufacture of building units from a plastic mix of a fluid, such as water, a binder, such as cement or lime, and an aggregate, such as sand, gravel or cinders. The novel step of simultaneously vibrating the mold box while applying a pressure to compress the plastic mix inside the mold box has produced the novel result of decreasing the curing or drying time of the wet building units while decreasing the sizes of the voids therein. The structural strength properties of the building units manufactured according to this novel process are improved over similar units manufactured without the simultaneous application of vibration and compression forces. This is shown particularly in strength and modulus of rupture tests. It also has been observed that the building units manufactured according to the process of the present invention are cured and dried with less shrinkage than similar units manufactured according to conventional processes.

Without being limited to any particular theory to explain these and other novel and unexpected results, it is my belief that vibration of the mold boxes during the charging and compression stages not only increases the packing effect of the charged mix, and hence reduces the voids in the finished units, but that it refines the crystalline structure of the binder and hence increases the total specific surface area available to bind the aggregate into a cohesive mass. The vibration, at the same time, causes the fluid in the mix to migrate toward the exterior surfaces of the uncured building unit so that evaporation may occur readily. Hence the total time for drying or curing of the units is reduced as a direct result of the present process.

The machine and process of the present invention may be readily adapted to form many desired types of building units from various types of mixtures of materials. By regulation of the timing cycle, the period of vibration of the mold boxes may be varied. The compression effect exerted on the plastic mix of the mold boxes is the result of the total forces applied and the time during which such forces are exerted. Both the amount of the compression force and the total time during which it is exerted are variable by adjustment of the machine. Hence, the relative amounts of vibration and compression forces exerted on the building unit are variable factors in the process and in the machine operation. By proper selection of compression pressures, amplitude of vibration and timing of the machine cycles, the optimum conditions can be readily established for the selected materials to be used in the operation.

It will be seen that adjustment of the variable speed gear reducer 58 will control the rate of rotation of the table 52 as well as the length of time that the table is held stationary at each work station. This permits use of the machine with a wide variety of materials and provides a ready means for the positive control of the time factor in each stage of the manufacturing operations.

While hydraulic power means have been here disclosed as a preferred means for actuating certain of the machine operations, it is to be understood that any other suitable type of power means may be utilized. For example, mechanical pressure applying means may be utilized in place of the hydraulic cylinders shown in the compression and stripping stages of the machine.

Also, the particular type of material feeding and cutoff mechanism may be varied as required by the desired speeds of machine operation, the type of materials utilized, and the size and shape of the unit to be molded. Hence, the present invention is not limited to the particular material feeding and cutoff mechanism here shown and described.

The application of pressures to the materials in the mold box is automatically timed so that the desired pressure on the materials is maintained for a fixed time interval for each unit. This is particularly desirable in those instances in which the materials have a degree of elasticity and it is necessary to apply pressure sufficient to overcome the elastic limits of the material and force it to take a definite set. This uniformity in the application of pressures to the material aids in producing uniformity in the physical properties of the individual molded units. The use of such pressures also permits the use of relatively drier mixes of materials than are used in conventional operations since the pressures force the individual particles together and cause them to become fritted to each other. It is not necessary under these conditions to utilize as fluid a mix as is required in the conventional manufacture of such building units. This also permits a reduction in the amount of binder used. Thus the process and machine of the present invention may be utilized to produce building units having superior properties at no increase in cost over the cost of conventional units or they may be utilized to produce units having properties comparable to conventionally produced units but at a lowered cost.

I claim:

1. In a machine for the production of molded building units, a mold box, means to mount said mold box to said machine to permit vibration of said mold box chiefly in a horizontal plane independently of said machine and comprising a leaf spring having fixed portions thereof secured to said machine and having the individual leaves thereof disposed in vertical planes to thereby effect vibration of the free portions of said leaf spring chiefly in a horizontal plane, and means to secure said mold box to the free portions of said leaf spring.

2. In a machine for the production of molded building units and comprising a rotary table adapted to carry a plurality of spaced mold boxes through a series of work stations in a predetermined cycle, a base supporting said table, and a resilient mount and support for each of said mold boxes, said mount being resiliently movable in a horizontal direction and being substantially rigid against movement in a vertical direction to permit vibration of the mold box chiefly in a horizontal plane and independently of said table, said mold boxes being solely and separately supported by said resilient mounts on said table.

3. In a building unit machine having a mold box, a resilient mount and support for said mold box having fixed and free portions to permit vibration thereof chiefly in a horizontal plane and independently of said machine and comprising resilient means restrained to vibrate chiefly in a horizontal plane, said fixed portion of said resilient means being secured to said machine and said free portion of said resilient means being secured to said mold box, and electromagnetic vibrator means operatively connected with said resiliently mounted mold box.

4. In a machine adapted for molding building units within a mold box having a removable pallet resting on the bottom of said mold box, a stripper means to strip the pallet and molded building unit from said mold box, and operable pickoff means adapted to engage the pallet and building unit resting on said pallet and to remove said pallet and building unit from said stripper means and to convey said pallet and building unit to a conveyor system, said pickoff means including a pickoff arm movable in an essentially horizontal plane from a position below the molded building block and pallet toward the conveyor system, said pickoff arm having a spring hook normally urged toward an operative position to engage and move the pallet and block with the the pickoff arm when the latter is moved toward the conveyor mechanism, and adapted to be cammed by said pallet and block into an inoperative position when moved in the opposite direction.

5. In a machine for the mass production of molded building units, the combination of a rotatable table, a plurality of mold boxes, a resilient mounting for solely and separately supporting each of said mold boxes on said table, said mountings being resiliently movable in a horizontal plane and substantially rigid against movement in a vertical plane to permit vibration of said mold boxes independently of said table in an essentially horizontal plane, means for intermittently indexing said table and mold boxes relative to predetermined stations, electromagnetic means at a compression station for vibrating each mold box indexed thereat in an essentially horizontal plane, compression means at said compression station for compressing the mix within a mold box indexed thereat simultaneously with said horizontal vibration.

6. The combination as claimed in claim 5 and being further characterized in that a stripper plate rests freely on the bottom of each of said mold boxes and is adapted for engagement by said compression means for upward compression movement, and in that a bucking up plate is provided at said compression station above the mold box indexed thereat for compressing the mix in said mold box on the upward compression movement of said stripper plate.

7. The combination as claimed in claim 6 and being further characterized in that a pallet rests on the stripper plate within each mold box, means are provided at a stripper station succeeding said compression station for vertically stripping the pallets and compressed building unit thereon from the mold box indexed at the stripper station, and reciprocating pick-off arms are provided at said stripper station for engaging on a forward movement the pallet which is stripped from the mold box and for withdrawing said pallet and building unit thereon from said stripper plate on the return movement.

8. In a machine for the production of molded building units from a plastic mix and comprising a supporting structure, a mold box, a resilient mounting for solely supporting said mold box on said supporting structure, said resilient mounting having a fixed portion secured to said supporting structure and having a free portion secured to said mold box, the free portion of said mounting being resiliently movable in a horizontal direction and being substantially rigid against movement in a vertical direction, pressure means to compress the mix within said mold box, and a vibrator adapted to vibrate said mold box chiefly in a horizontal plane while the mix therein is under compression.

WALTER A. GRUENEBERG.

REFERENCES CITED

The following references are of record in the file of this patent:

UNITED STATES PATENTS

| Number | Name | Date |
|---|---|---|
| 687,688 | Klay | Nov. 26, 1901 |
| 917,748 | Burton | Apr. 13, 1909 |
| 1,418,227 | Brock | May 30, 1922 |
| 1,526,893 | Balaam | Feb. 17, 1925 |
| 1,545,376 | Weatherby | July 7, 1925 |
| 1,559,200 | Straight | Oct. 27, 1925 |
| 1,574,985 | McWain | Mar. 2, 1926 |
| 1,575,391 | Stanton | Mar. 2, 1926 |
| 1,583,406 | McClelland | May 4, 1926 |
| 1,599,151 | Vought | Sept. 7, 1926 |
| 1,632,286 | Graham | June 14, 1927 |
| 1,695,327 | Goldston | Dec. 18, 1928 |
| 1,740,711 | Pelton | Dec. 24, 1929 |
| 1,765,064 | Eberling | June 17, 1930 |
| 1,777,660 | Dahl | Oct. 7, 1930 |
| 1,787,449 | Jackson | Jan. 6, 1931 |
| 1,792,844 | Knecht | Feb. 17, 1931 |
| 1,825,117 | Hudson | Sept. 29, 1931 |
| 1,884,528 | Benner et al. | Oct. 25, 1932 |

(Other references on following page)

UNITED STATES PATENTS

| Number | Name | Date |
|---|---|---|
| 1,932,520 | Horsch | Oct. 31, 1933 |
| 1,993,930 | Hole | Mar. 12, 1935 |
| 1,995,947 | Seil | Mar. 26, 1935 |
| 2,018,192 | Sexton | Oct. 22, 1935 |
| 2,047,356 | Boyle | July 14, 1936 |
| 2,106,329 | Scott | Jan. 25, 1938 |
| 2,193,879 | Muenzer | Mar. 19, 1940 |
| 2,270,829 | Wellnitz | Jan. 20, 1942 |
| 2,275,676 | Gelbman et al. | Mar. 10, 1942 |
| 2,319,313 | Flam | May 18, 1943 |
| 2,342,769 | Suchann | Feb. 29, 1944 |
| 2,470,377 | Shepeck | May 17, 1949 |